US012117753B2

(12) United States Patent
Kamiya et al.

(10) Patent No.: US 12,117,753 B2
(45) Date of Patent: Oct. 15, 2024

(54) PRESSING DEVICE AND PRESSING PROCESS APPARATUS USING THE SAME

(71) Applicant: FUJIFILM Business Innovation Corp., Tokyo (JP)

(72) Inventors: Shogo Kamiya, Kanagawa (JP); Takashi Ohashi, Kanagawa (JP); Kouichi Kimura, Kanagawa (JP); Shingo Akiyama, Kanagawa (JP); Toyohiko Awano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 19 days.

(21) Appl. No.: 17/958,444

(22) Filed: Oct. 3, 2022

(65) Prior Publication Data

US 2023/0314994 A1 Oct. 5, 2023

(30) Foreign Application Priority Data

Mar. 29, 2022 (JP) ................................ 2022-052965

(51) Int. Cl.
*G03G 15/20* (2006.01)

(52) U.S. Cl.
CPC . *G03G 15/2064* (2013.01); *G03G 2215/2009* (2013.01); *G03G 2215/2025* (2013.01)

(58) Field of Classification Search
CPC ....... G03G 15/2064; G03G 2215/2009; G03G 2215/2025
See application file for complete search history.

(56) References Cited

U.S. PATENT DOCUMENTS

| | | | | |
|---|---|---|---|---|
| 5,124,755 A * | 6/1992 | Hediger ............. | G03G 15/2053 399/329 |
| 2008/0152401 A1* | 6/2008 | Kimura .............. | G03G 15/2053 399/329 |
| 2009/0208262 A1* | 8/2009 | Osada ................ | G03G 15/2064 399/329 |
| 2010/0172677 A1* | 7/2010 | Hosokawa ......... | G03G 15/2064 399/329 |
| 2011/0305473 A1* | 12/2011 | Tamaki .............. | G03G 15/2053 399/329 |
| 2012/0141174 A1* | 6/2012 | Kurita .................. | G03G 15/161 399/329 |
| 2013/0279957 A1* | 10/2013 | Kasama ............. | G03G 15/2064 399/329 |
| 2017/0285538 A1* | 10/2017 | Nishimura ......... | G03G 15/2028 |
| 2020/0183306 A1 | 6/2020 | Oonishi | |

FOREIGN PATENT DOCUMENTS

| | | | |
|---|---|---|---|
| JP | 2007279665 A * | 10/2007 | ......... G03G 15/2028 |
| JP | 2009168909 A * | 7/2009 | |
| JP | 2017107015 A * | 6/2017 | |
| JP | 2017111188 A * | 6/2017 | |
| JP | 2020095119 | 6/2020 | |

* cited by examiner

*Primary Examiner* — Sevan A Aydin
(74) *Attorney, Agent, or Firm* — JCIPRNET

(57) ABSTRACT

A pressing device includes a first pressurization unit; a second pressurization unit that is provided to face the first pressurization unit, and sandwiches and pressurizes a medium moving in a contact region formed between the first pressurization unit and the second pressurization unit; and a contact region variable unit that changes a width dimension of the contact region along a moving direction of the medium in a state of maintaining a contact pressure on an outlet side of the contact region, in varying a contact state of the contact region.

20 Claims, 26 Drawing Sheets

PRESSING PAD LINEAR MOVEMENT TYPE

PRESSING PAD SWING TYPE

PRESSURIZATION ROLL LINEAR MOVEMENT TYPE

PRESSURIZATION ROLL SWING TYPE

PRESSING DEVICE AND PRESSING PROCESS APPARATUS USING THE SAME

CROSS-REFERENCE TO RELATED APPLICATIONS

This application is based on and claims priority under 35 USC 119 from Japanese Patent Application No. 2022-052965 filed Mar. 29, 2022.

BACKGROUND

(i) Technical Field

The present invention relates to a pressing device that pressurizes a moving medium and a pressing process apparatus using the same.

(ii) Related Art

In the related art, examples of pressing process apparatus including this type of pressing device include an apparatus disclosed in JP2020-95119A (DETAILED DESCRIPTION, and FIG. 5).

JP2020-95119A (DETAILED DESCRIPTION, and FIG. 5) discloses an image forming apparatus including a fixing device that has a pad member and a pressing member that forms a fixing nip area N in cooperation with the pad member; a contact state variable mechanisms that make variable at least one or both of the pad member and the pressing member to change a contact state between the pad member and the pressing member, and changes a pressure distribution in the fixing nip area N; an image information detection unit that detects image information on a sheet after passing through the fixing nip area; and a control unit that controls the contact state variable mechanism such that the pressure distribution in the fixing nip area is changed on the basis of a detection result of the image information by the image information detection unit.

SUMMARY

Aspects of non-limiting embodiments of the present disclosure relate to a pressing device and a pressing process apparatus using the same that suppress the generation of wrinkles in a medium and maintains good releasability of the medium even in a case where a thin medium is used in a case of pressurizing a moving medium having a different thickness.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a pressing device including a first pressurization unit; a second pressurization unit that is provided to face the first pressurization unit, and sandwiches and pressurizes a medium moving in a contact region formed between the first pressurization unit and the second pressurization unit; and a contact region variable unit that changes a width dimension of the contact region along a moving direction of the medium in a state of maintaining a contact pressure on an outlet side of the contact region, in varying a contact state of the contact region.

BRIEF DESCRIPTION OF THE DRAWINGS

Exemplary embodiment(s) of the present invention will be described in detail based on the following figures, wherein.

DETAILED DESCRIPTION

Outline of Exemplary Embodiment

Figure 1A:
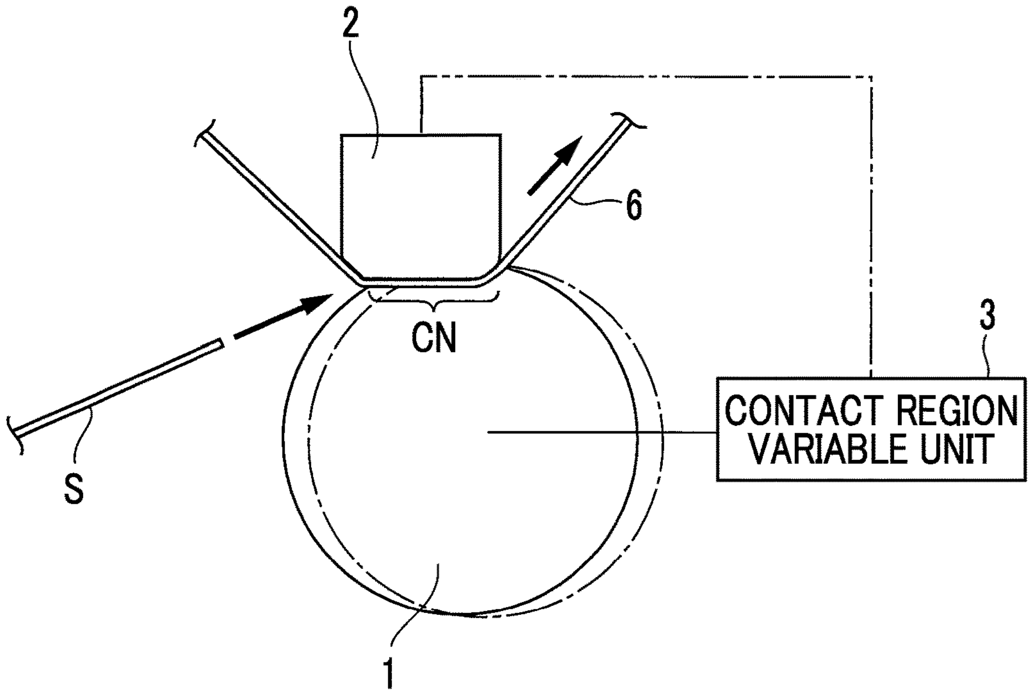
FIG. 1A is an explanatory diagram showing an outline of an exemplary embodiment of a first typical mode of a pressing device to which the present invention is applied.

FIG. 1A shows an outline of an exemplary embodiment of a first typical mode of a pressing device to which the present invention is applied.

In FIG. 1A, the pressing device according to the first typical mode includes a first pressurization unit 1, a second pressurization unit 2 that is provided to face the first pressurization unit 1, and sandwiches and pressurizes a medium S moving in a contact region CN formed between the first pressurization unit 1 and the second pressurization unit 2, and a contact region variable unit 3 that changes a width dimension of the contact region CN along a moving direction of the medium S in a state of maintaining a contact pressure on the outlet side of the contact region CN, in varying a contact state of the contact region CN.

Figure 1B:
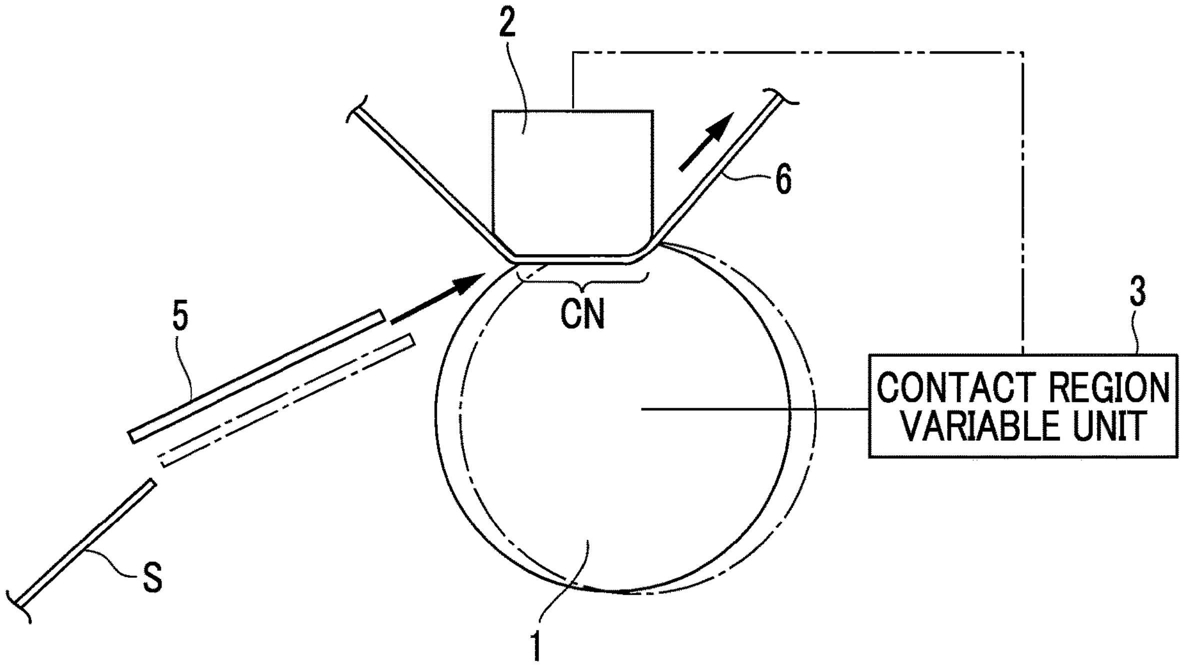
FIG. 1B is an explanatory diagram showing an outline of an exemplary embodiment of a second typical mode of a pressing device to which the present invention is applied.

FIG. 1B shows an outline of an exemplary embodiment of a second typical mode of the pressing device to which the present invention is applied.

In FIG. 1B, the pressing device according to the second typical mode includes a medium guide unit 5 that is provided on an upstream side of the contact region CN in the moving direction of the medium S, and guides the medium S in accordance with an inlet portion of the contact region CN, which is changed by the contact region variable unit 3, in addition to the first pressurization unit 1, the second pressurization unit 2, and the contact region variable unit 3.

In such technical means, the first pressurization unit 1 and the second pressurization unit 2 may be selected as appropriate, but in the examples of FIGS. 1A and 1B, the first pressurization unit 1 consists of a rotatable roll member, and the second pressurization unit 2 is configured by a pressing member fixedly installed on a back surface of an endless belt member 6 that causes the rotation of the first pressurization unit 1 to be followed. In FIGS. 1A and 1B, the rotation of the first pressurization unit 1 is caused to be followed, but it is also possible to rotationally drive the first pressurization unit 1 to cause the rotation of the endless belt member 6 to be followed.

In this example, the contact region CN is secured by interposing the belt member 6 between the first pressurization unit 1 and the second pressurization unit 2, and an object to be pressurized on the medium S can be pressurized while the medium S is transported in a state of being interposed. However, the contact region CN is secured between the first pressurization unit 1 and the second pressurization unit 2 without interposing the belt member 6, and an object to be pressurized on the medium S may be pressurized while the medium S is transported in a state of being interposed.

Further, the contact region variable unit 3 is typically variable in two stages to have any of a width dimension of the contact region CN for a thin medium S having a predetermined thickness or less, or a width dimension of the contact region for the other medium S (thick medium), but may be variable in three or more stages without being limited thereto.

Further, the contact region variable unit 3 needs to change the width dimension of the contact region CN along the moving direction of the medium S in a state of maintaining the contact pressure on the outlet side of the contact region CN.

Therefore, for the medium S having a different thickness, in a case where the thin medium S is used while keeping the width dimension of the contact region CN for the thick medium S without changing the width dimension of the contact region CN along the moving direction of the medium S, wrinkles are likely to be generated, and in a case where the contact pressure is lowered to avoid wrinkles, there is a concern that the releasability of the medium S from the contact region at an outlet side end portion may be impaired. However, in this example, the contact region variable unit 3 can narrow the width dimension of the contact region CN in a state of maintaining the contact pressure on the outlet side of the contact region CN, which acts on the thin medium S to reduce the causes of the generation of wrinkles and the deterioration of the releasability.

Furthermore, in this example, the belt member 6 is interposed between the first pressurization unit 1 and the second pressurization unit 2. However, since the contact region variable unit 3 is in a state of maintaining the contact pressure on the outlet side of the contact region CN, the strain rate of the belt member 6 can be suppressed as compared with a case where the contact pressure on the outlet side of the contact region CN fluctuates.

Further, as the pressing device of this example, for example, a heating unit (not shown) for heating the belt member 6 or the second pressurization unit 2 may be provided. In this case, since the pressing device also functions as a heating device, the pressing device can be applied as, for example, a heating and pressing type fixing device. It is also possible to provide a heating unit (not shown) to the first pressurization unit 1.

Next, a typical mode or a preferred mode of the configuration requirements for the pressing device according to the present exemplary embodiment will be described.

As a typical mode of the contact region variable unit 3, a mode is exemplified in which the first pressurization unit 1 or the second pressurization unit 2 is moved along the width direction of the contact region CN. In this example, for example, it is preferable to change the width dimension of the contact region CN with the position of the outlet side end portion of the contact region CN as a reference.

Further, as another typical mode of the contact region variable unit 3, a mode is exemplified in which the first pressurization unit 1 or the second pressurization unit 2 is swung around a swing fulcrum so as to change the width dimension of the contact region CN. In this example, for example, it is preferable to maintain an intrusion amount of the outlet side end portion of the contact region CN at the same level in a swing range of the first pressurization unit 1 or the second pressurization unit 2.

Further, as a preferred mode of the contact region variable unit 3, a mode is exemplified in which in a case where the medium S is a thin medium having a predetermined thickness or less, the width dimension of the contact region CN is narrowed as compared with other cases. In this example, a discrimination unit (not shown) for discriminating the type of the medium S having a different thickness is provided, and in a case where the discrimination unit discriminates that the medium S is a thin medium having a predetermined thicknesses or less, the contact region variable unit 3 may narrow the width dimension of the contact region CN as compared with other cases. The discrimination unit here includes a detection unit that detects the thickness of the medium S, a designation unit that designates that the medium is a thin medium, and the like, and includes a wide range of units necessary for discriminating medium type information as to whether or not the medium is a thin medium.

Further, as another preferred mode of the contact region variable unit 3, a mode is exemplified in which in a case where the medium S is a thin medium having a predetermined thickness or less, the surface pressure of the outlet side end portion of the contact region CN is larger than the surface pressure of the other portions of the contact region. This example is effective in maintaining good releasability of the thin medium S passing through the contact region CN.

Further, in the pressing device shown in FIG. 1B, as a typical mode of the medium guide unit 5, a mode is exemplified in which the medium guide unit is moved following the movement of the first pressurization unit 1 or the second pressurization unit 2 in a case where the first pressurization unit 1 or the second pressurization unit 2 is moved by the contact region variable unit 3.

In this example, as a preferred mode of the medium guide unit 5, there is a mode in which the medium guide unit is moved along the contact region CN by the movement amount of the first pressurization unit 1 or the second pressurization unit 2 in a case where the first pressurization unit 1 or the second pressurization unit 2 is moved along the width direction of the contact region CN by the contact region variable unit 3, or a mode in which the medium guide unit is swung around the swing fulcrum by a swing amount of the first pressurization unit 1 or the second pressurization unit 2 in a case where the first pressurization unit 1 or the second pressurization unit 2 is swung by the contact region variable unit 3.

Hereinafter, the present invention will be described in more detail on the basis of the exemplary embodiments shown in the accompanying drawings.

First Exemplary Embodiment

Overall Configuration of Image Forming Apparatus

Figure 2:
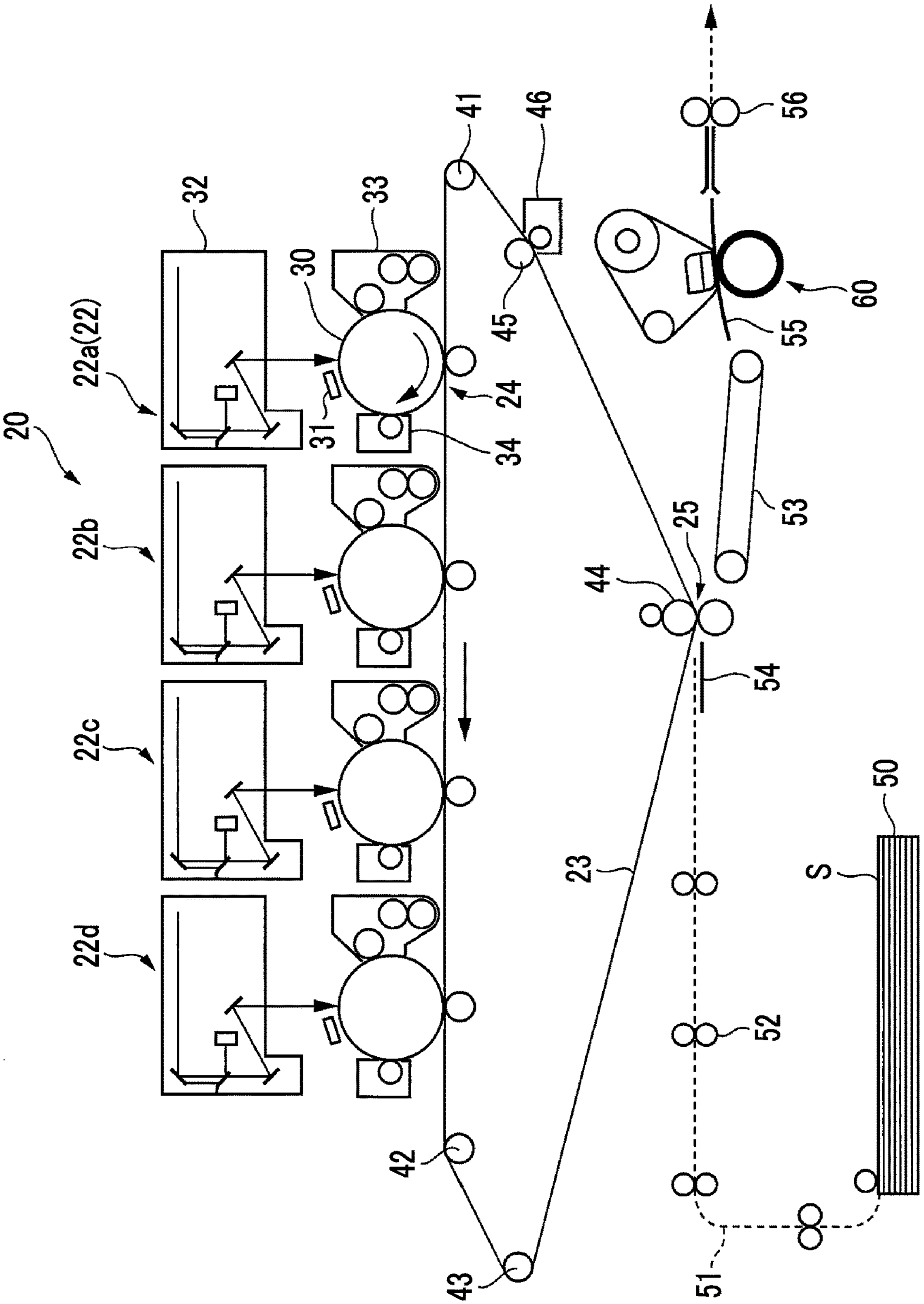
FIG. 2 is an explanatory diagram showing an overall configuration of an image forming apparatus as a pressing process apparatus according to a first exemplary embodiment.

FIG. 2 is an explanatory diagram showing an overall configuration of an image forming apparatus as a pressing process apparatus according to a first exemplary embodiment.

In FIG. 2, an image forming apparatus 20 is a so-called tandem type image forming apparatus of an intermediate transfer method, and includes a plurality of image forming units 22 (22*a* to 22*d*) in which toner images of respective color components (in this example, four colors of yellow (Y), magenta (M), cyan (C), and black (K)) are formed by electrophotography, a belt-shaped intermediate transfer body 23 is arranged at a portion to correspond to each image forming unit 22, a primary transfer device 24 (for example, a primary transfer roll) is arranged at the back surface of the intermediate transfer body 23 to correspond to each image forming unit 22, a secondary transfer device (for example, a secondary transfer roll) 25 in which each color component toner image, which has been primarily transferred from each image forming unit 22 to the intermediate transfer body 23 by the primary transfer device 24, is secondarily transferred onto the medium S such as a sheet, a fixing device 60 is arranged on the downstream side of the transport direction of the medium S onto which each color component toner image has been transferred, and an unfixed toner image on the medium S is fixed.

In this example, the plurality of image forming units 22, the intermediate transfer body 23, the primary transfer device 24, and the secondary transfer device 25 correspond to a processing unit that applies an object to be pressurized onto the medium S, and the fixing device 60 corresponds to the pressing device.

Here, each image forming unit 22 has a drum-shaped photoconductor 30 that rotates in a predetermined direction; a charging device 31 that charges the photoconductor 30; an exposure device 32 such as a laser scanning device that writes an electrostatic latent image on the photoconductor 30 charged by the charging device 31; a developing device 33 that develops the electrostatic latent image written on the photoconductor 30 by the exposure device 32 with a corresponding color toner; and a cleaning device 34 that cleans residues on the photoconductor 30 after the toner image developed by the developing device 33 is primarily transferred onto the intermediate transfer body 23 by the primary transfer device 24, and the charging device 31, the exposure device 32, the developing device 33, and the cleaning device 34 are arranged around the photoconductor 30.

Further, the intermediate transfer body 23 is hung on a plurality of tension rolls 41 to 45, and for example, the tension roll 41 is used as a drive roll to be circularly rotated in a predetermined direction. Further, the tension roll 44 also serves as an opposing roll of the secondary transfer roll as the secondary transfer device 25, and is configured to generate a secondary transfer electric field for the secondary transfer between the secondary transfer roll and the opposing roll. Further, an intermediate transfer cleaning device 46 is disposed on the surface of the intermediate transfer body 23 corresponding to the tension roll 45.

Further, a medium supply device 50 is provided below the intermediate transfer body 23, and the medium S supplied from the medium supply device 50 is transported along a transport path 51 to the fixing device 60 via the secondary transfer device 25. In the transport path 51, there are provided an appropriate number of transport rolls 52, a transport belt 53 for the transportation from the secondary transfer device 25 to the fixing device 60, further, plate-shaped guide chutes 54 and 55 that guide the medium S to a secondary transfer part by the secondary transfer device 25 and a fixing part of the fixing device 60, respectively, a discharge roll 56 for discharging the medium S to a medium discharge unit (not shown), and the like.

Fixing Device

Next, the fixing device 60 used in the present exemplary embodiment will be described with reference to FIG. 3.

Figure 3:
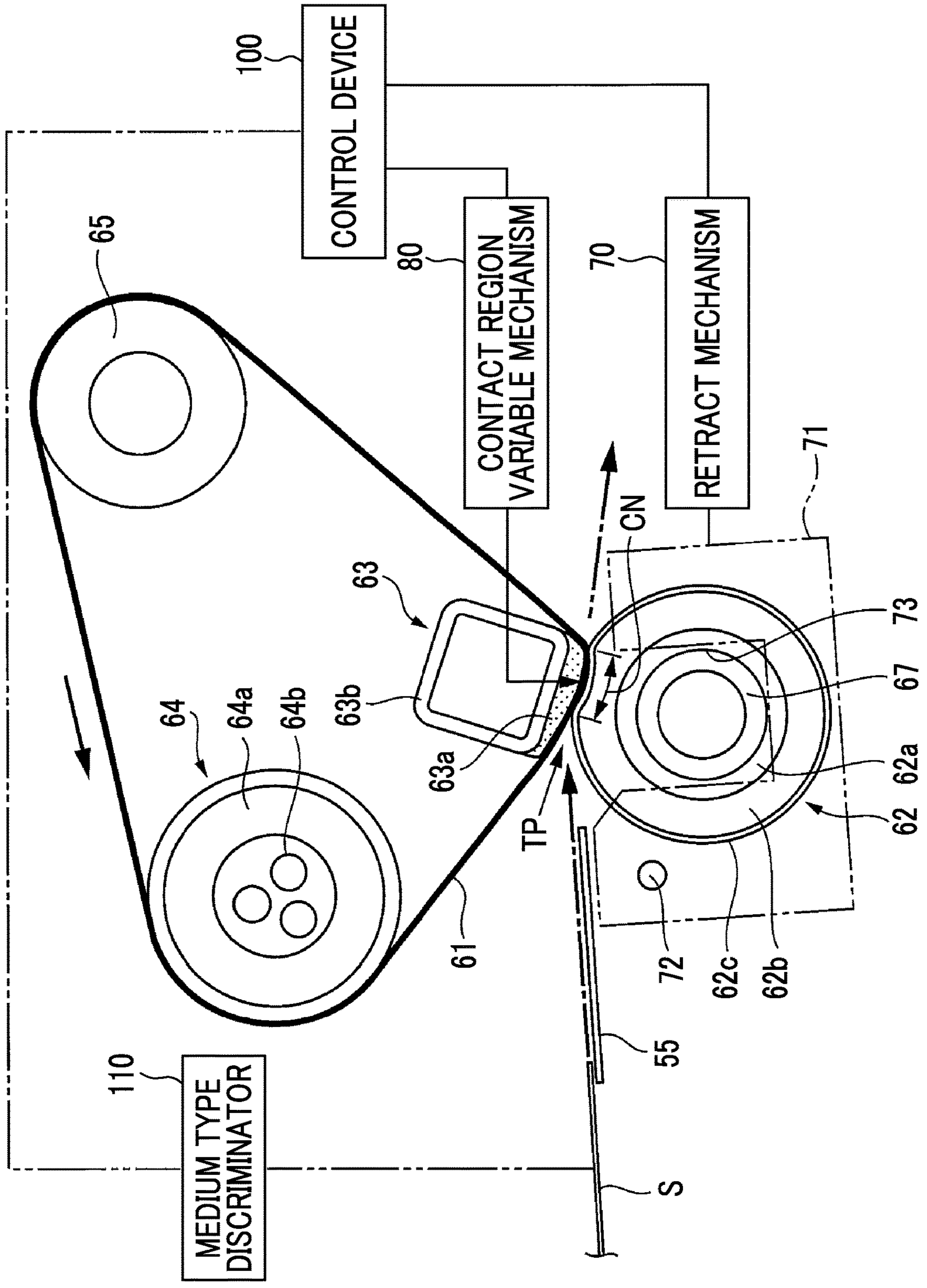
FIG. 3 is an explanatory diagram showing a fixing device as a heating device used in the first exemplary embodiment.

In FIG. 3, the fixing device 60 includes a fixing belt 61 consisting of a heat-resistant material that is circularly moved; a pressurization roll 62 as the first pressurization unit which is arranged to be in contact with a surface part facing the fixing region of the fixing belt 61; a pressing pad 63 as the second pressurization unit which is arranged to be in contact with the rear surface of the fixing belt 61 facing the pressurization roll 62, and interposes and transports the medium S to the contact region CN formed between the pressurization roll 62 and the fixing region of the fixing belt 61; a heat roll 64 that stretches the fixing belt 61 such that the fixing belt 61 can be circularly moved at a part of the fixing belt 61 on the upstream side of the contact region CN in the moving direction, and is in contact with the fixing belt 61 to heat the fixing belt 61; and a tension roll 65 that stretches the fixing belt 61 such that the fixing belt 61 can be circularly moved at a part of the fixing belt 61 on the downstream side of the contact region CN in the moving direction.

Fixing Belt

The fixing belt 61 is configured such that a heat-resistant resin material such as polyimide (PI) resin is used as a base material, an elastic layer such as silicon rubber is laminated on the surface of the base material, and a release layer made of a fluororesin is laminated, and the thermal conductivity along the thickness direction and surface direction is generally low.

Pressurization Roll

In the pressurization roll 62, an elastic material **62*b* such as urethane rubber is laminated around a metal roll 62*a* is used, and a protective layer 62*c*** is laminated on the surface of the elastic material.

In this example, in the pressurization roll 62, both end shaft portions of the metal roll **62*a* are rotatably supported via a bearing 67**.

Pressing Pad

The pressing pad 63 functions as a receiving member arranged to be in contact with the rear surface of the fixing belt 61, and has a plate-shaped pad body **63*a* configured of a liquid crystal polymer or the like, and a holder base 63*b* consisting of a substantially rectangular hollow pipe that holds the pad body 63*a***.

In this example, the pad body **63*a* has a higher hardness than the elastic material of the pressurization roll 62, and the contact region CN intrudes toward the pressurization roll 62 in a case where the contact region CN is formed between the fixing belt 61 and the pressurization roll 62**.

Figure 7:
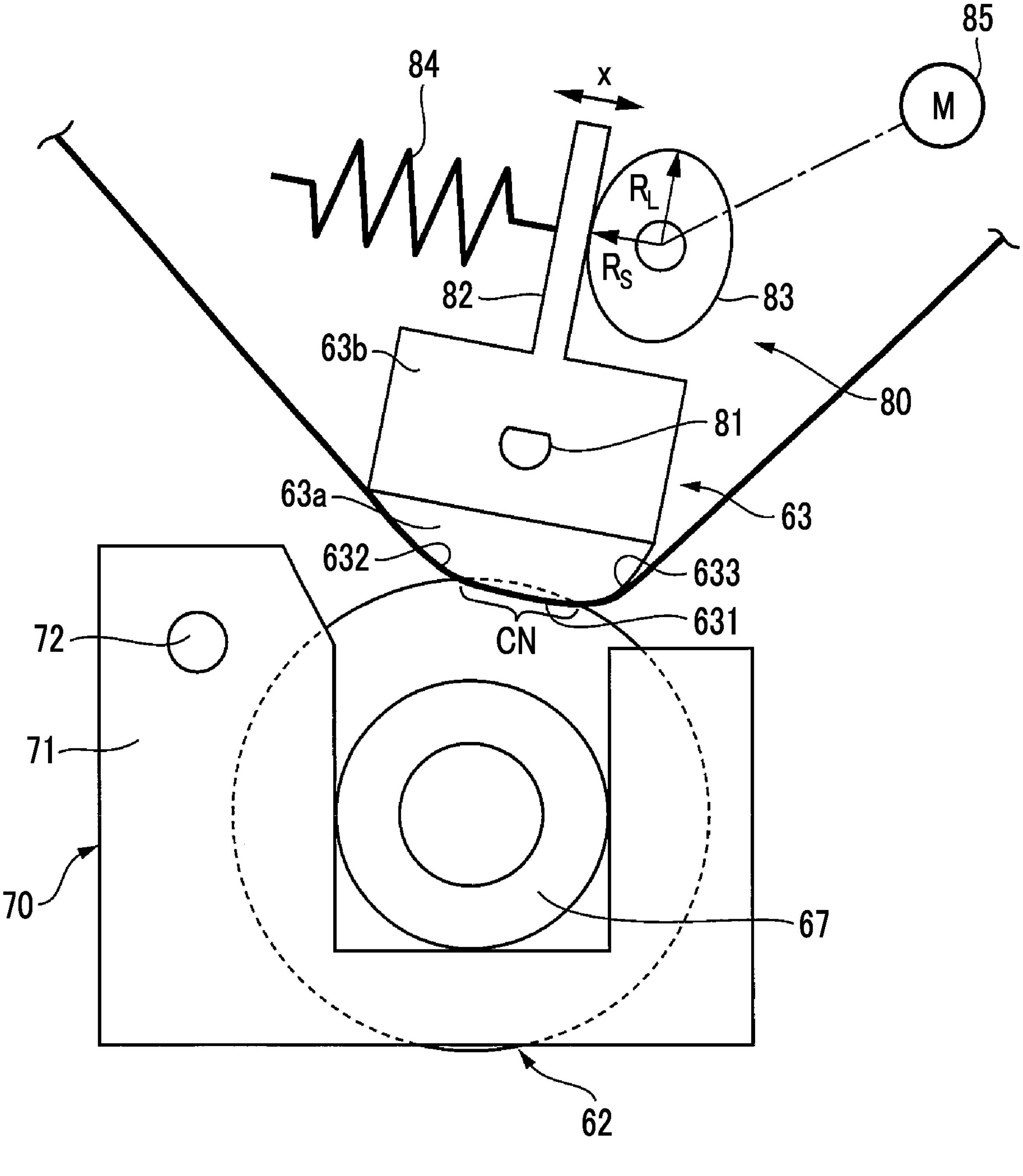
FIG. 7 is an explanatory diagram showing a first configuration example of the contact region variable mechanism used in the first exemplary embodiment.

Here, the shape of the surface portion of the pad body **63*a* facing the pressurization roll 62 may be appropriately selected, but in this example, the surface portion of the pad body 63*a* has a flat portion 631 along the transport direction of the medium S, a front curved portion 632 with a gentle radius of curvature is formed at a portion of the flat portion 631 on the inlet side of the medium S, and a rear curved portion 633 with a sharp radius of curvature is formed at a portion of the flat portion 631 on the outlet side of the medium S, as shown in FIG. 7. In this example, the flat portion 631 is arranged to be inclined such that the front curved portion 632 side is located slightly above the rear curved portion 633** side.

Heat Roll

In the heat roll 64, a heat source **64*b* such as a halogen lamp is built in a roll body 64*a*, and both end shaft portions of the roll body 64*a* are rotatably held by a bearing (not shown). Then, the heat roll 64 conducts heat to the fixing belt 61 by bringing the peripheral surface of the roll body 64*a* into contact with the rear surface of the fixing belt 61, and heats the fixing belt 61** to be subjected to the fixing processing in the contact region CN.

Further, in this example, the heat roll 64 functions as a drive roll that rotates and moves the fixing belt 61. Therefore, in this example, the pressurization roll 62 is rotated following the fixing belt 61 in the contact region CN.

The heat roll 64 may be configured to heat a resistance heating layer by forming the resistance heating layer on the roll body **64*a*** via an insulating layer, for example, instead of the heat source such as a halogen lamp.

Tension Roll

The tension roll 65 may stretch the fixing belt 61 such that the fixing belt 61 can be circularly moved, but may function as a tension roll for applying tension from the viewpoint of maintaining the tension of the fixing belt 61.

Further, in a case where it is necessary to further increase the amount of heating the fixing belt 61, the heat source may be incorporated in the tension roll 65 or the above-mentioned pressing pad 63.

Peripheral Structure of Fixing Device

Guide Chute

In this example, as shown in FIG. 3, the guide chute 55 regulates a guide trajectory of the medium S such that a target position TP where the leading edge of the medium S is introduced is selected at a predetermined part of the fixing belt 61 in front of the inlet of the contact region CN (corresponding to the fixing region) of the fixing device 60, and the medium S is guided to the contact region CN while being in contact with the fixing belt 61 after the leading edge of the medium S hits the target position TP of the fixing belt 61.

Here, as the target position TP, an optimum location may be selected from the locations corresponding to the front curved portion 632 of the pad body **63*a* of the pressing pad 63**.

Retract Mechanism

In this example, as shown in FIG. 3, the pressurization roll 62 is brought into contact with and separated from a set position at which the pressurization roll is in contact with the fixing belt 61 via a retract mechanism 70 and a retract position at which the pressurization roll is not in contact with the fixing belt 61. In this example, the retract mechanism 70 has a swing holding arm 71 that is swung around a swing support shaft 72, and a U-shaped groove 73 in which the bearings 67 positioned at both ends of the pressurization roll 62 are received is formed in the swing holding arm 71 so that the pressurization roll 62 is brought into contact with and separated from the swing holding arm.

Contact Region Variable Mechanism

In this example, as shown in FIG. 3, a contact region variable mechanism 80 that varies the width dimension of the contact region CN along the transport direction of the medium S is provided.

As shown in FIGS. 4A to 4D, the contact region variable mechanism 80 of this type is appropriately classified into the following four types.

Figure 4A:
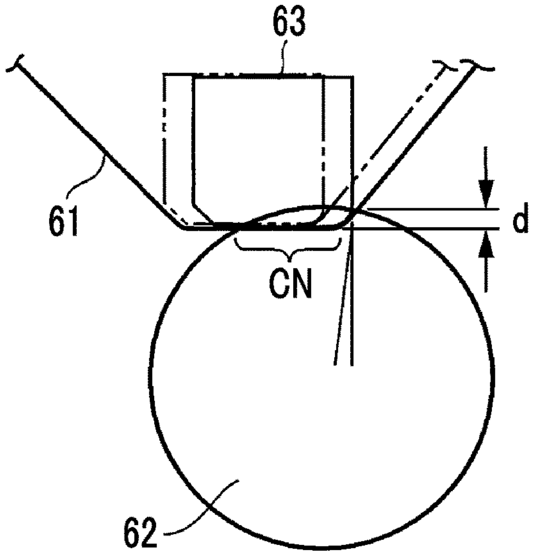
FIGS. 4A to 4D are explanatory diagrams showing various configuration principles of a contact region variable mechanism of the fixing device used in the first exemplary embodiment.

(1) Pressing Pad Linear Movement Type (Refer to FIG. 4A)

This is a method in which the pressing pad 63 is linearly moved along the width direction of the contact region CN, and the width dimension of the contact region CN is changed with the position of the outlet side end portion of the contact region CN as a reference. In this example, assuming that the medium S having a predetermined thickness (for example, 80 gsm) or less is a thin medium (hereinafter, referred to as "thin medium" as necessary), in a case where a thick medium (hereinafter, referred to as "thick medium" as necessary) that is not a thin medium is used (in a thick medium mode), the pressing pad 63 may be arranged so as to widen the width dimension of the contact region CN as indicated by the solid line, and conversely, in a case where a thin medium is used (in a thin medium mode), the pressing pad 63 may be linearly moved so as to narrow the width dimension of the contact region CN, as indicated by the two-dot chain line.

Figure 4B:
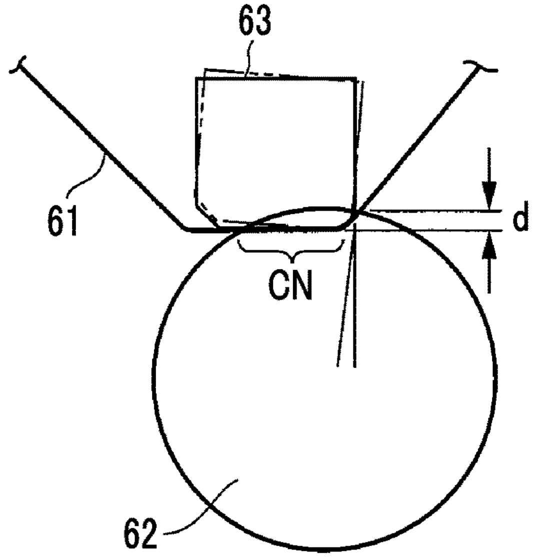

(2) Pressing Pad Swing Type (Refer to FIG. 4B)

In this method, the pressing pad 63 is swung around a swing fulcrum (not shown) so as to change the width dimension of the contact region CN. In this example, in a thick medium mode, the pressing pad 63 may be arranged so as to widen the width dimension of the contact region CN as indicated by the solid line, and conversely, in a thin medium mode, the pressing pad 63 may be swung so as to narrow the width dimension of the contact region CN as indicated by the two-dot chain line.

Figure 4C:
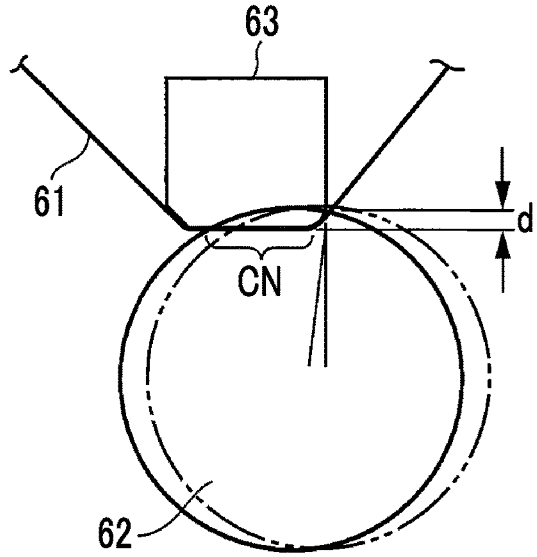

(3) Pressurization Roll Linear Movement Type (Refer to FIG. 4C)

This is a method in which the pressurization roll 62 is linearly moved along the width direction of the contact region CN, and the width dimension of the contact region CN is changed with the position of the outlet side end portion of the contact region CN as a reference. In this example, in a thick medium mode, the pressurization roll 62 may be arranged so as to widen the width dimension of the contact region CN as indicated by the solid line, and conversely, in a thin medium mode, the pressurization roll 62 may be linearly moved so as to narrow the width dimension of the contact region CN as indicated by the two-dot chain line.

Figure 4D:
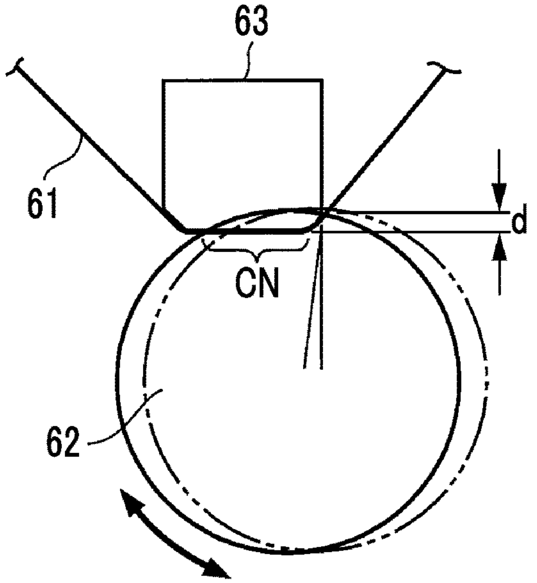

(4) Pressurization Roll Swing Type (Refer to FIG. 4D)

In this method, the pressurization roll 62 is swung around a swing support shaft (not shown) (which is different from the support shaft of the pressurization roll 62) so as to change the width dimension of the contact region CN. In this example, in a thick medium mode, the pressurization roll 62 may be arranged so as to widen the width dimension of the contact region CN as indicated by the solid line, and conversely, in a thin medium mode, the pressurization roll 62 may be swung so as to narrow the width dimension of the contact region CN as indicated by the two-dot chain line.

Pressure Distribution in Contact Region

As described above, in any of cases (1) to (4), for example, it is preferable that an intrusion amount d of the outlet side end portion of the contact region CN by the pressing pad 63 is adjusted to be approximately the same in either a thick medium mode or a thin medium mode, for example.

Figure 5:
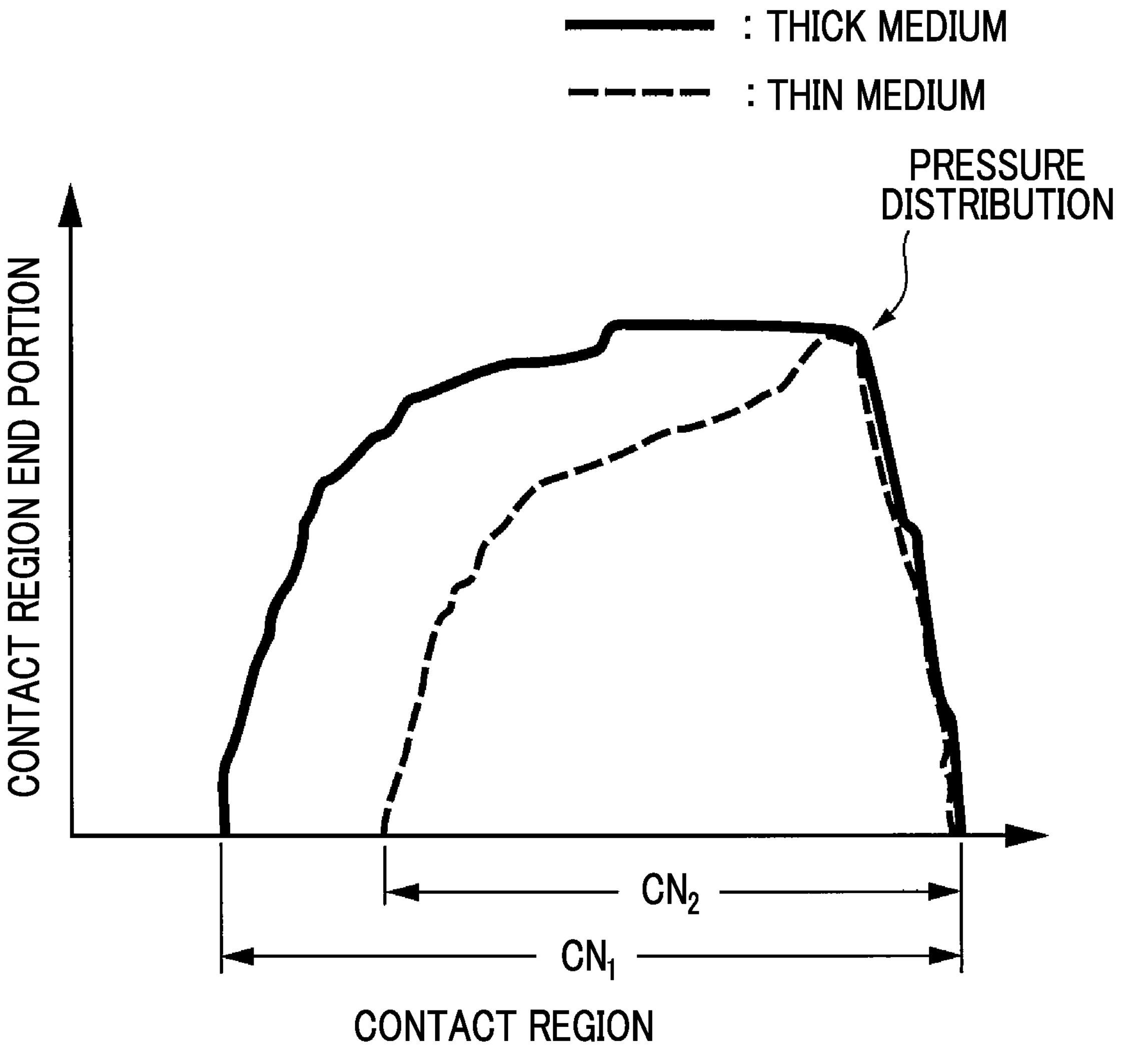
FIG. 5 is an explanatory diagram showing an example of pressure distributions in a contact region of a thick medium mode and a thin medium mode by contact region variable processing of the fixing device according to the first exemplary embodiment.

In this example, as shown in FIG. 5, in a thick medium mode, a contact region CN1, which is wider than a contact region CN2 in a thin medium mode, is obtained, and a pressure distribution having a large value to a certain extent is secured over substantially the entire contact region CN1.

On the other hand, in a thin medium mode, the contact region CN2, which is narrower than the contact region CN1 in a thick medium mode, is obtained, and the average value of the contact pressure is lower than that in a thick medium mode, so that wrinkles are less likely to be generated in a case where the thin medium passes through the contact region CN2. Further, since the contact pressure at the outlet side end portion of the contact region CN1 is set higher than the contact pressure of other portions, there is no concern that the releasability of the thin medium from the contact region CN1 may be impaired in a case where the thin medium passes through the contact region CN2.

Control System of Fixing Device

In FIG. 3, the reference numeral 100 denotes a control device consisting of a microcomputer including various processors. The "processor" here refers to a processor in a broad sense, and includes a general-purpose processor (for example, a central processing unit (CPU), or the like), and a dedicated processor (for example, a graphics processing unit (GPU), an application specific integrated circuit (ASIC), a field programmable gate array (FPGA), a programmable logic device, and the like).

Figure 6:
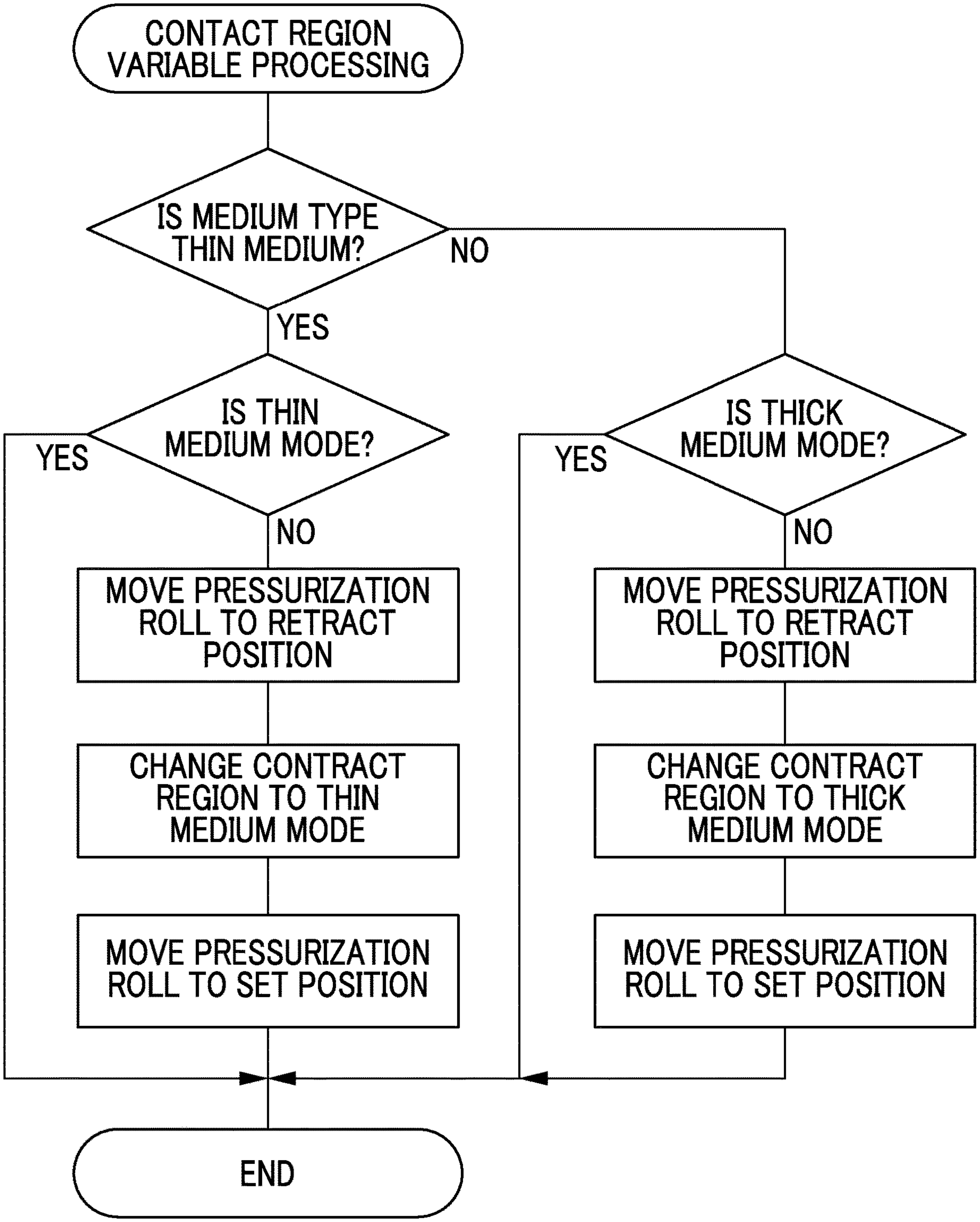
FIG. 6 is an explanatory diagram showing a flowchart of contact region variable processing of the fixing device according to the exemplary embodiment.

In this example, the control device 100 installs in advance a contact region variable processing program (refer to FIG. 6) in a memory (not shown), loads medium type discrimination information from a medium type discriminator 110 into the processor, and controls the retract mechanism 70 and a contact region variable mechanism 80.

The medium type discriminator 110 here includes a thickness detector that directly detects whether the medium S is a thin medium or a thick medium other than the thin medium, a medium designator that prepares a usable medium type table in the memory in the control device 100, and designates a medium to be used from the medium type table, and the like, and the medium type information discriminated on the basis of these pieces of information is taken into the control device 100.

Variable Contact Region Variable Processing

Next, the contact region variable processing of the fixing device in the present exemplary embodiment will be described.

The control device 100 first discriminates the medium type, and confirms whether or not the medium type is a thin medium.

Then, assuming that the medium type is a thin medium, it is confirmed whether or not the contact region variable mechanism 80 is in a thin medium mode, and in a case where the contact region variable mechanism 80 is not in a thin medium mode, after the pressurization roll 62 is moved to the retract position by the retract mechanism 70, the contact region CN is changed to a thin medium mode, and the pressurization roll 62 is moved to the set position again. Here, the reason why the variable processing of the contact region CN is performed in a state where the pressurization roll 62 is retracted to the retract position is that there is a concern that, in a case where the variable processing of the contact region CN is performed while the pressurization roll 62 is maintained at the set position, the movement of the pressing pad 63 or the pressurization roll 62 may damage the contact part with the fixing belt 61.

On the contrary, in the case of a thin medium mode, the thin medium mode is maintained without performing the variable processing of the contact region CN.

Further, assuming that the medium type is a thick medium, it is confirmed whether or not the contact region variable mechanism 80 is in a thick medium mode, and in a case where the contact region variable mechanism 80 is not in a thick medium mode, after the pressurization roll 62 is moved to the retract position by the retract mechanism 70, the contact region CN is changed to a thick medium mode, and the pressurization roll 62 is moved to the set position again. On the contrary, in the case of a thick medium mode, the thick medium mode is maintained without performing the variable processing of the contact region CN.

Configuration Example of Contact Region Variable Mechanism

In the present exemplary embodiment, a specific configuration example of the contact region variable mechanism will be described.

First Configuration Example (Refer to FIG. 7 to FIG. 8D)

FIG. 7 shows a first configuration example of the contact region variable mechanism 80 according to the first exemplary embodiment.

In FIG. 7, the contact region variable mechanism 80 is arranged such that D-cut guide projections 81 projects from both ends of the holder base 63*b* of the pressing pad 63 in a longitudinal direction, a support frame (not shown) is arranged on both sides of the guide projection 81, a long hole (not shown) extending in the width direction of the contact region CN along the transport direction of the medium S is formed in the support frame, and the guide projection 81 is slidably (slide movement) fitted into the long hole, so that the pressing pad 63 can be linearly moved along the width direction (x direction in FIG. 7) of the contact region CN.

In the contact region variable mechanism, a projection piece 82 extending in a direction orthogonal to the width direction of the contact region CN is provided at a portion of the holder base 63*b*, an eccentric cam 83 is arranged to be in contact with the projection piece 82, a bias spring 84 that biases the projection piece 82 toward the eccentric cam 83 is arranged on the opposite side of the projection piece 82 from the eccentric cam 83, and a drive motor 85 rotates the eccentric cam 83 by switching between a long diameter position and a short diameter position.

Figure 8A:
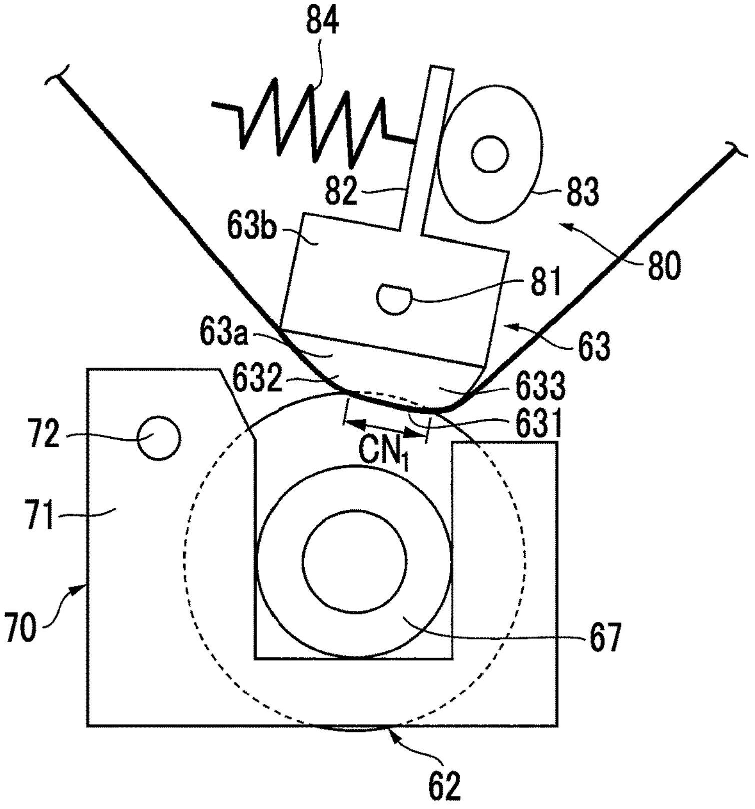
FIG. 8A is an explanatory diagram showing an operation state in a thick medium mode using the first configuration example shown in FIG. 7.

In this example, as shown in FIGS. 7 and 8A, in a case where a short diameter $R_S$ of the eccentric cam 83 abuts on the projection piece 82, the pressing pad 63 is arranged so as to secure the contact region CN1 for a thick medium mode.

Figure 8B:
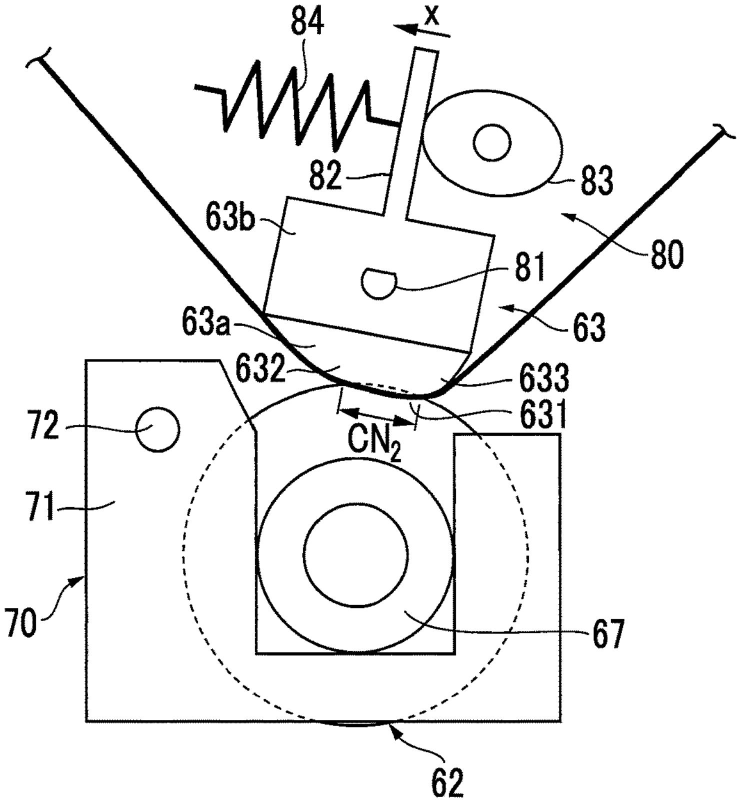
FIG. 8B is an explanatory diagram showing an operation state in a thin medium mode using the same first configuration example.

On the other hand, as shown in FIGS. 7 and 8B, in a case where a long diameter $R_L$ of the eccentric cam 83 abuts on the projection piece 82, the pressing pad 63 is moved to the inlet side of the medium S along the width direction (x direction in FIG. 8B) of the contact region CN, and is arranged so as to secure the contact region CN2 for a thin medium mode. In this case, since the shape of the pad body 63*a* of the pressing pad 63 (the flat portion 631, the front curved portion 632, the rear curved portion 633) is devised, even in a case where the pressing pad 63 is moved to the inlet side of the medium S, although the width dimension of the contact region CN2 becomes narrower than the width dimension of the contact region CN1, the contact pressure of the outlet side end portion of the contact region CN2 is maintained without reduction as long as the intrusion amount of the outlet side end portion of the contact region CN2 is set to be approximately the same as the intrusion amount of the outlet side end portion of the contact region CN1.

Figure 9:
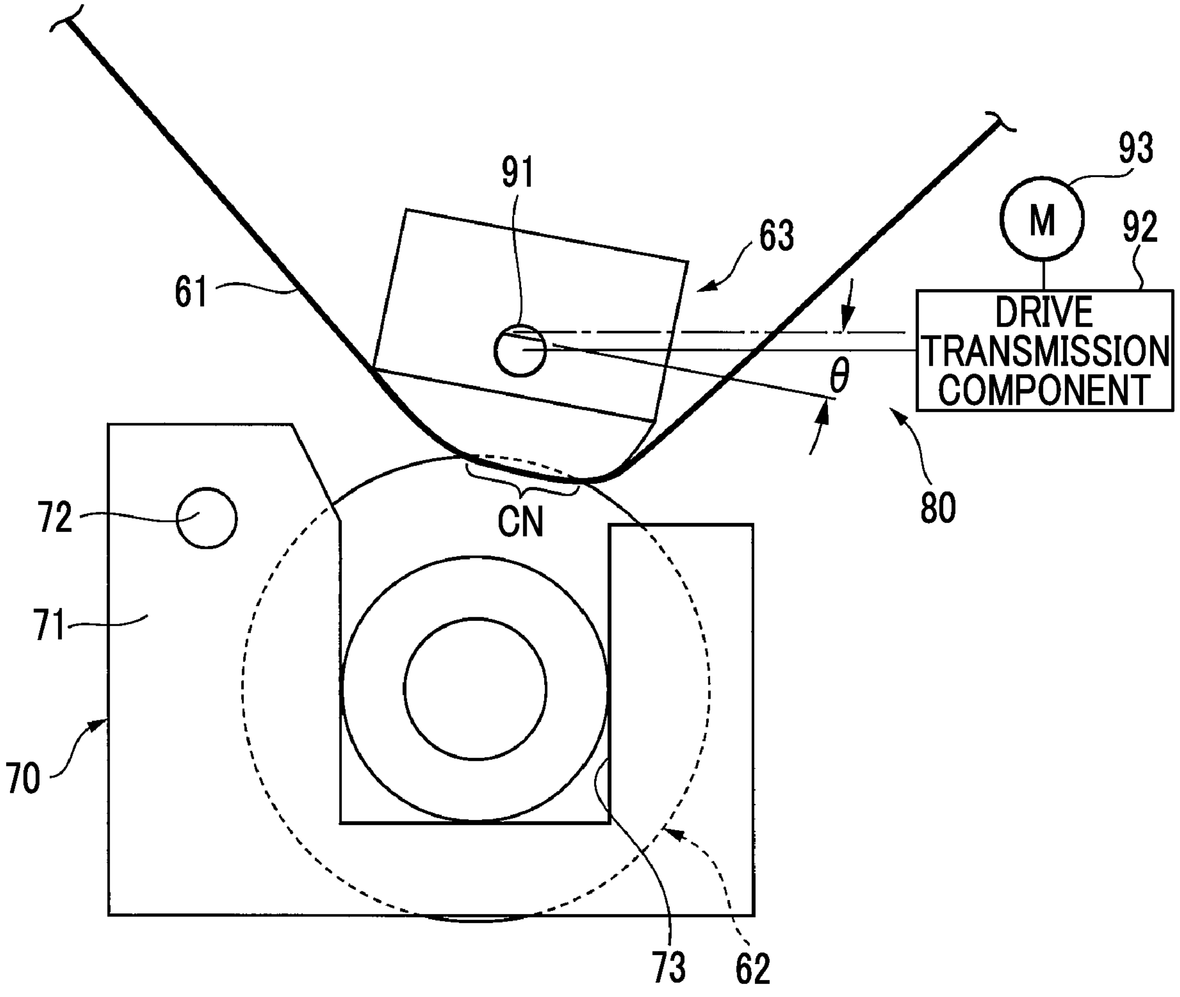
FIG. 9 is an explanatory diagram showing a second configuration example of the contact region variable mechanism used in the first exemplary embodiment.
Figure 10A:
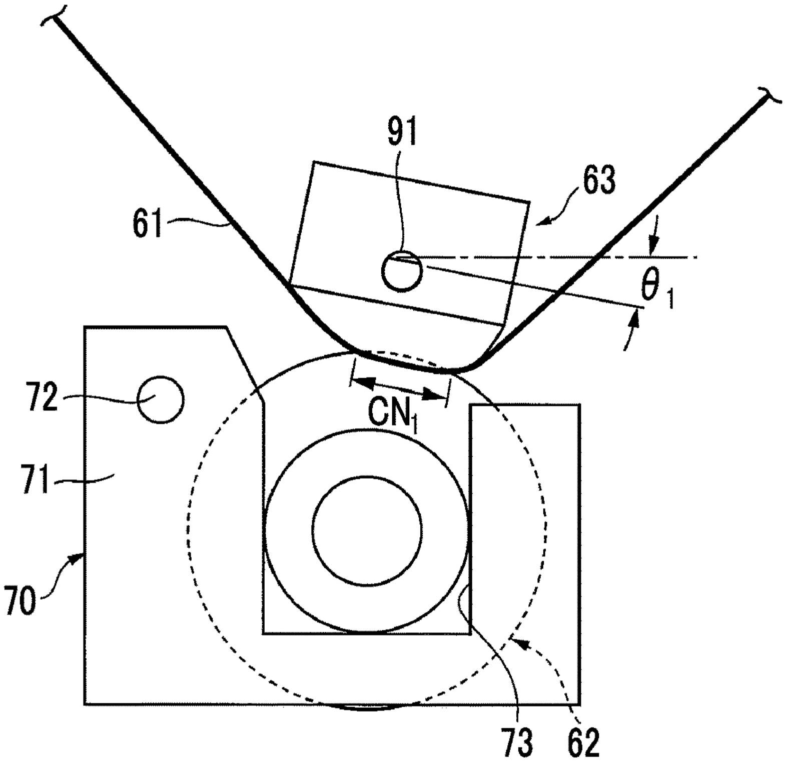
FIG. 10A is an explanatory diagram showing an operation state in a thick medium mode using the second configuration example shown in FIG. 9.
Figure 10B:
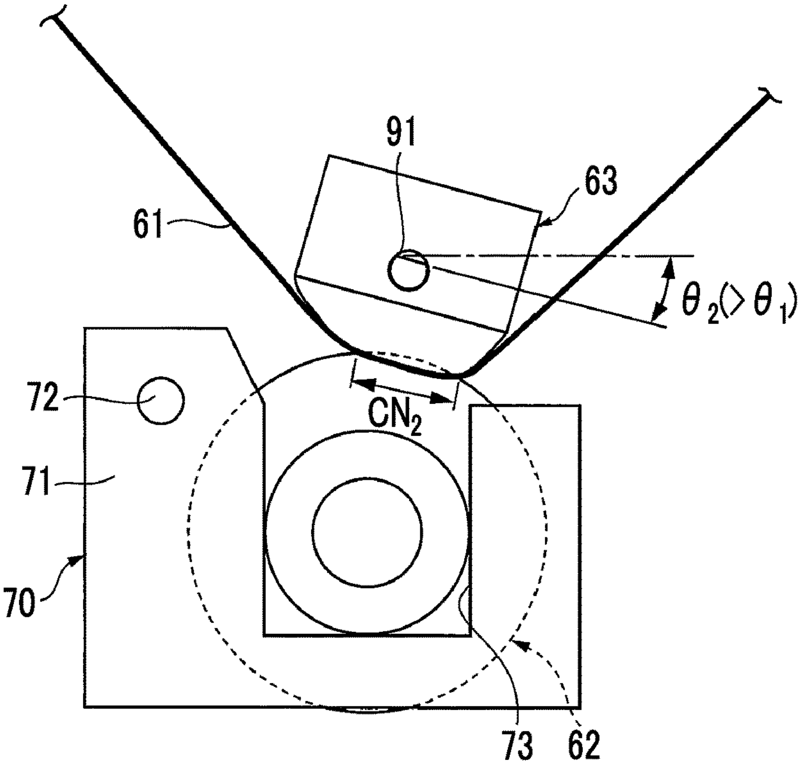
FIG. 10B is an explanatory diagram showing an operation state in a thin medium mode using the same second configuration example.

Second Configuration Example (Refer to FIGS. 9 to 10B)

FIG. 9 shows a second configuration example of the contact region variable mechanism 80 according to the first exemplary embodiment.

In FIG. 9, in the contact region variable mechanism 80, for example, a D-cut swing support shaft 91 projects from both ends of the holder base 63*b* of the pressing pad 63 in the longitudinal direction, and the swing support shaft 91 and the shaft of a drive motor 93 are connected by a drive transmission component 92 such as transmission gears or couplings.

As a result, the pressing pad 63 is swung around the swing support shaft 91.

In this example, as shown in FIGS. 9 and 10A, in a case where the swing position of the pressing pad 63 forms an angle θ1 with respect to the horizontal line, the pressing pad 63 is arranged so as to secure the contact region CN1 for a thick medium mode.

On the other hand, as shown in FIGS. 9 and 10B, in a case where the swing position of the pressing pad 63 reaches a position forming an angle θ2 (>θ1) with respect to the horizontal line, the rear curved portion 633 side of the pressing pad 63 further intrudes toward the pressurization roll 62, but the front curved portion 632 side of the pressing pad 63 is lifted from the pressurization roll 62 side, and therefore the pressing pad is arranged so as to secure the contact region CN2 for a thin medium mode. In this case, since the shape of the pad body 63*a* of the pressing pad 63 (the flat portion 631, the front curved portion 632, the rear curved portion 633) is devised, although the width dimension of the contact region CN2 becomes narrower than the width dimension of the contact region CN1, the contact pressure of the outlet side end portion of the contact region CN2 is maintained without reduction due to the further intrusion of the outlet side end portion of the contact region CN2.

Figure 11:
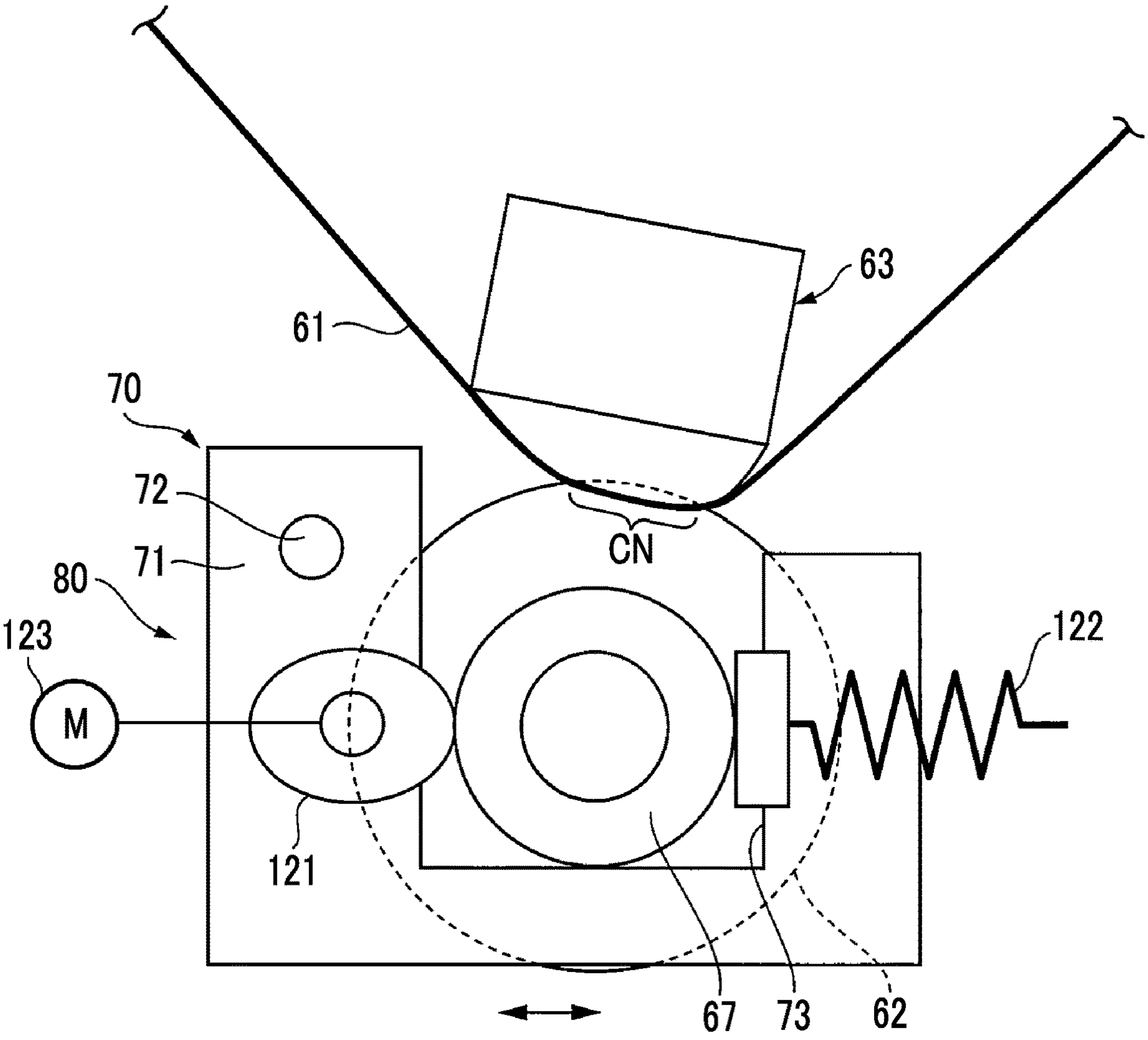
FIG. 11 is an explanatory diagram showing a third configuration example of the contact region variable mechanism used in the first exemplary embodiment.
Figure 12A:
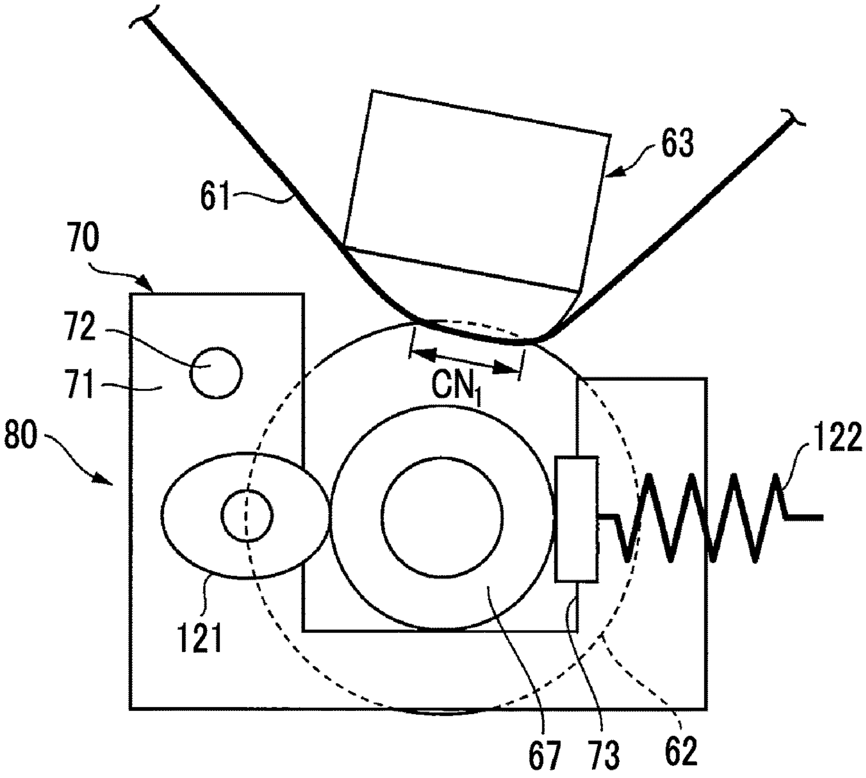
FIG. 12A is an explanatory diagram showing an operation state in a thick medium mode using the third configuration example shown in FIG. 11.
Figure 12B:
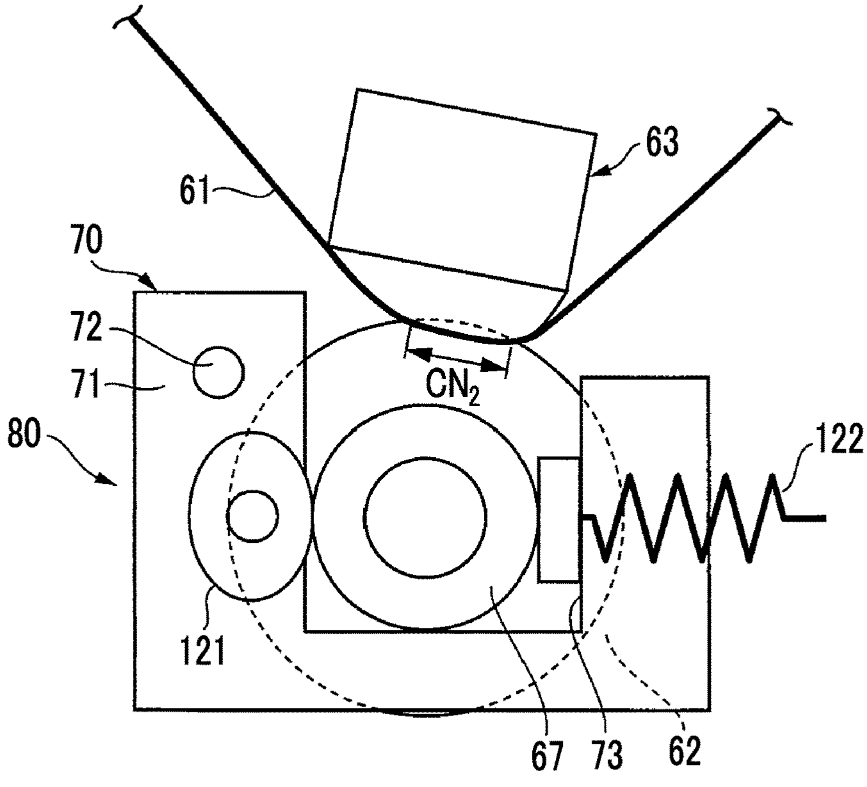
FIG. 12B is an explanatory diagram showing an operation state in a thin medium mode using the same third configuration example.

Third Configuration Example (Refer to FIGS. 11 to 12B)

FIG. 11 shows a third configuration example of the contact region variable mechanism 80 according to the first exemplary embodiment.

In FIG. 11, the contact region variable mechanism 80 linearly moves the pressurization roll 62 along the width direction (x direction in FIG. 11: corresponding to a substantially horizontal direction in this example) of the contact region CN.

In this example, in the contact region variable mechanism 80, the bearing 67 of the pressurization roll 62 is arranged in the U-shaped groove 73 of the swing holding arm 71 of the retract mechanism 70 with clearance in the width direction of the contact region CN, an eccentric cam 121 is arranged on the upstream side in the transport direction of the medium S to be in contact with the bearing 67, a bias spring 122 that biases the bearing 67 toward the eccentric cam 121 is arranged on the opposite side of the bearing 67 from the eccentric cam 121, and a drive motor 123 rotates the eccentric cam 121 by switching between a long diameter position and a short diameter position.

In this example, as shown in FIGS. 11 and 12A, in a case where a long diameter $R_L$ of the eccentric cam 121 abuts on the bearing 67, the pressurization roll 62 is arranged so as to secure the contact region CN1 for a thick medium mode.

On the other hand, as shown in FIGS. 11 and 12B, in a case where a short diameter $R_S$ of the eccentric cam 121 abuts on the bearing 67, the pressurization roll 62 is moved to the inlet side of the medium S along the width direction (x direction in FIG. 12B) of the contact region CN, and is arranged so as to secure the contact region CN2 for a thin medium mode.

In this case, although the width dimension of the contact region CN2 becomes narrower than the width dimension of the contact region CN1 by the amount by which the pressurization roll 62 is moved to the inlet side of the medium S, the intrusion amount of the outlet side end portion of the contact region CN2 is not changed much from the intrusion amount of the outlet side end portion of the contact region CN1 due to the relative positional relationship with the pressing pad 63, and therefore, the contact pressure of the outlet side end portion of the contact region CN2 is maintained without reduction.

Figure 13:
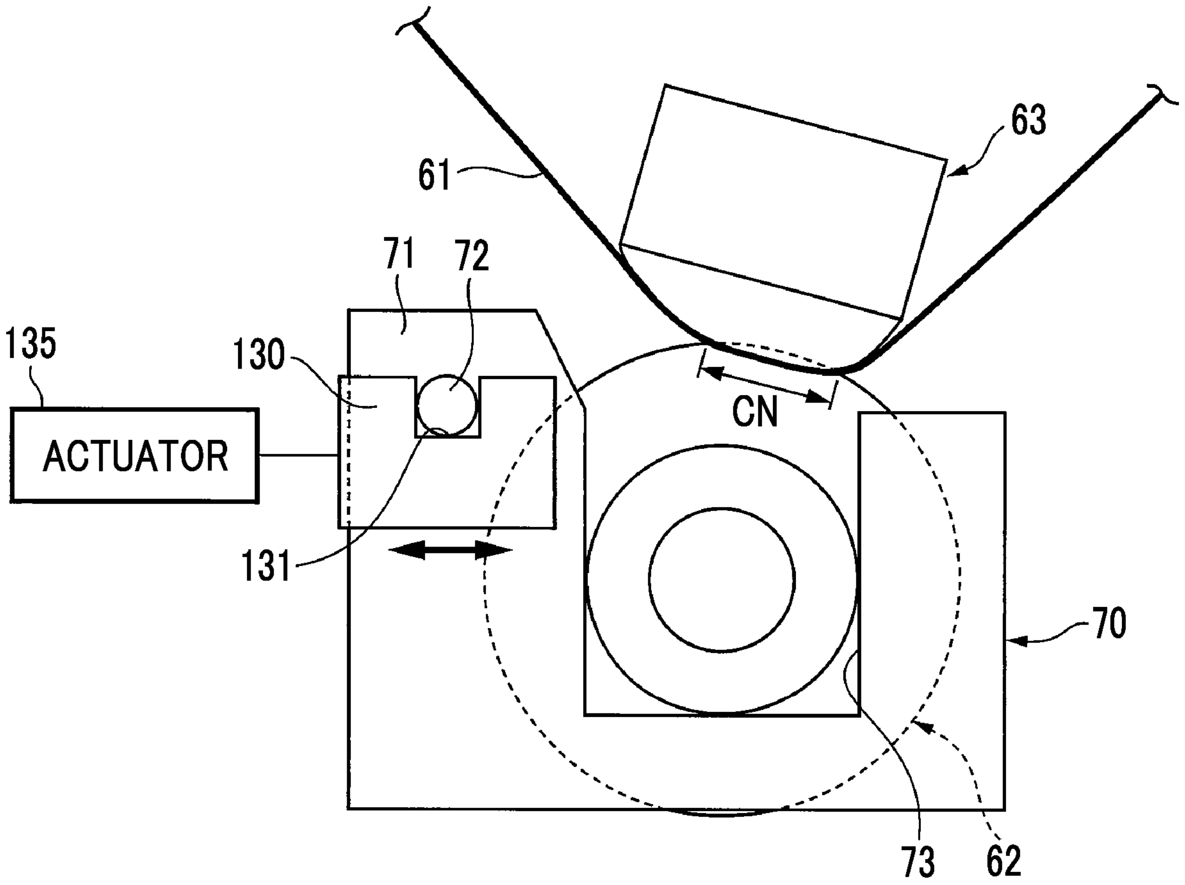
FIG. 13 is an explanatory diagram showing a fourth configuration example of the contact region variable mechanism used in the first exemplary embodiment.
Figure 14A:
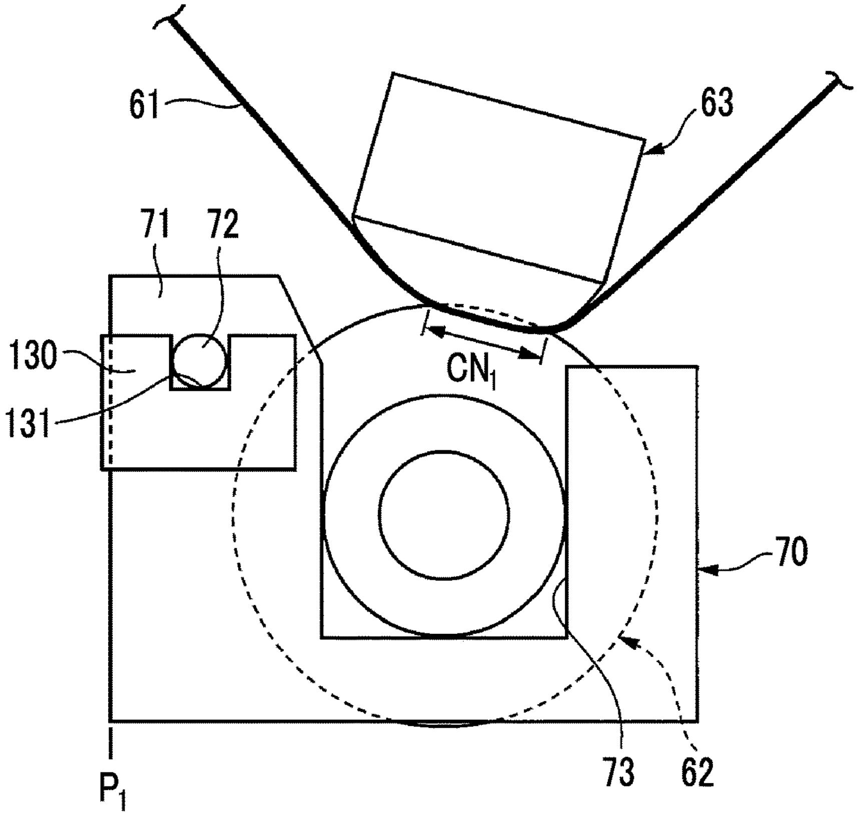
FIG. 14A is an explanatory diagram showing an operation state in a thick medium mode using the fourth configuration example shown in FIG. 13.
Figure 14B:
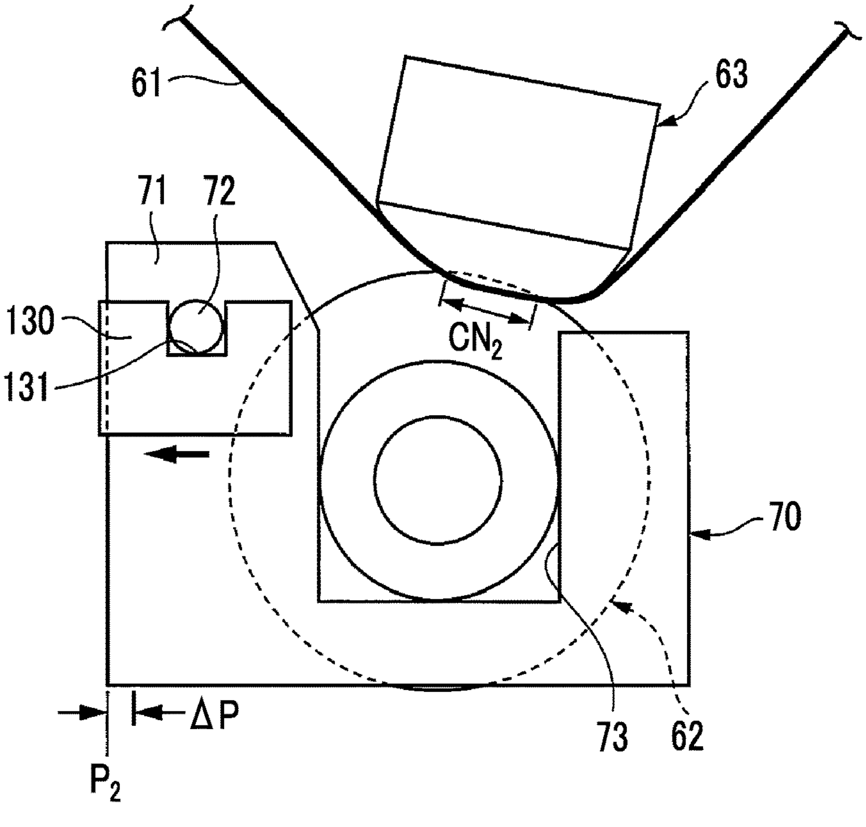
FIG. 14B is an explanatory diagram showing an operation state in a thin medium mode using the same fourth configuration example.

Fourth Configuration Example (Refer to FIGS. 13 to 14B)

FIG. 13 shows a fourth configuration example of the contact region variable mechanism 80 according to the first exemplary embodiment.

In FIG. 13, the contact region variable mechanism 80 linearly moves the pressurization roll 62 integrally with the swing holding arm 71 along the width direction (x direction in FIG. 13: corresponding to a substantially horizontal direction in this example) of the contact region CN.

In this example, in the contact region variable mechanism 80, the swing support shaft 72 of the swing holding arm 71 is held by a movable holder 130, and the movable holder 130 is linearly moved along the width direction (x direction in FIG. 13: corresponding to a substantially horizontal direction in this example) of the contact region CN by an actuator 135.

Here, the movable holder 130 is movable in the x direction along a guide rail (not shown), and the movable holder 130 has a U-shaped groove 131 in which the swing support shaft 72 is held in a state of being swingable.

In this example, as shown in FIGS. 13 and 14A, in a case where a left end position of the swing holding arm 71 in FIG. 14A is a position P1, the pressurization roll 62 is arranged so as to secure the contact region CN1 for a thick medium mode.

On the other hand, as shown in FIGS. 13 and 14B, in a case where the movable holder 130 is moved in the x direction by ΔP toward the upstream side in the transport direction of the medium S, and the left end position of the swing holding arm 71 in FIG. 14B reaches a position P2, the pressurization roll 62 is moved to the inlet side of the medium S along the width direction (x direction in FIG. 14B) of the contact region CN, and is arranged so as to secure the contact region CN2 for a thin medium mode.

In this case, although the width dimension of the contact region CN2 becomes narrower than the width dimension of the contact region CN1 by the amount by which the pressurization roll 62 is moved to the inlet side of the medium S, the intrusion amount of the outlet side end portion of the contact region CN2 is not changed much from the intrusion amount of the outlet side end portion of the contact region CN1 due to the relative positional relationship with the pressing pad 63, and therefore, the contact pressure of the outlet side end portion of the contact region CN2 is maintained without reduction.

Figure 15:
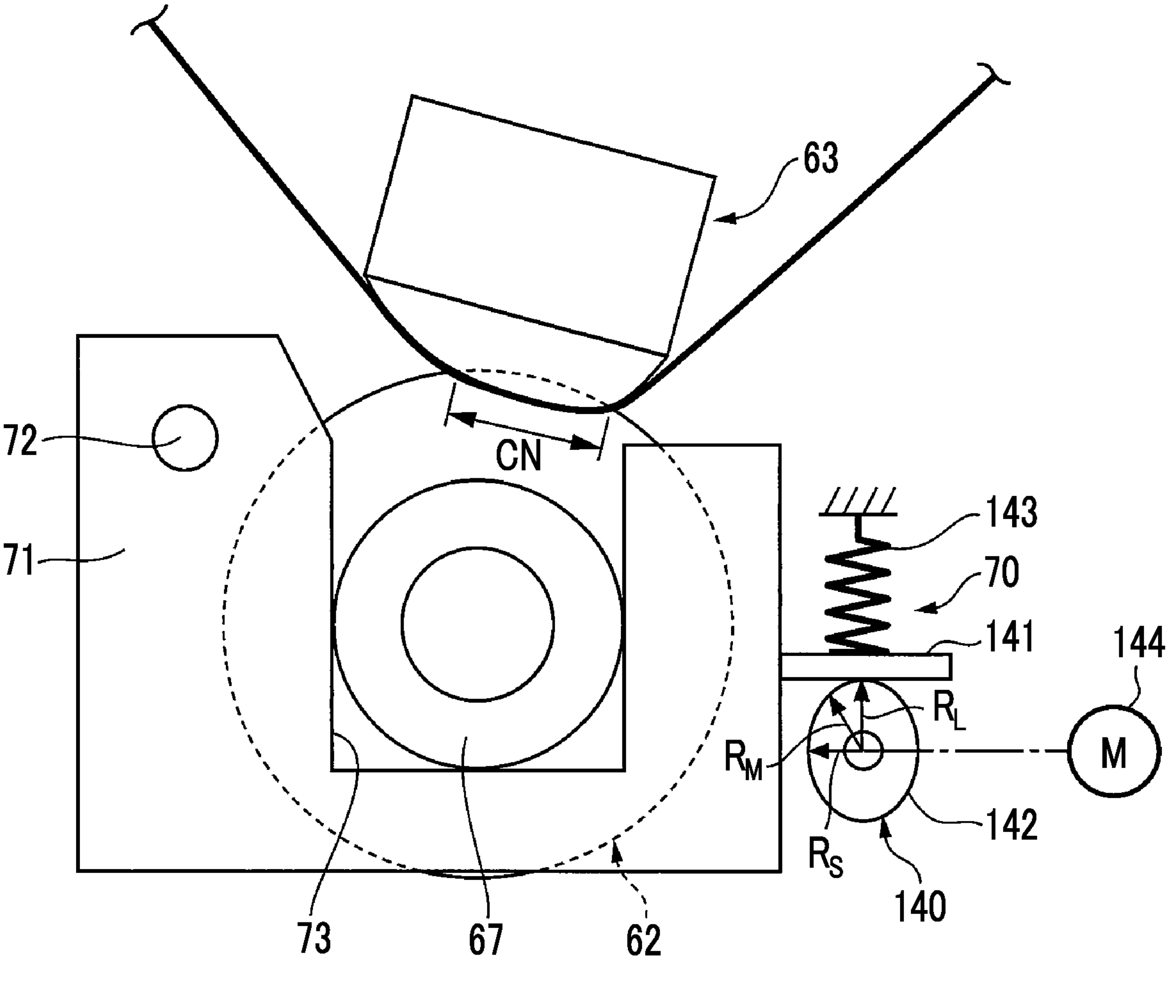
FIG. 15 is an explanatory diagram showing a fifth configuration example of the contact region variable mechanism used in the first exemplary embodiment.
Figure 16A:
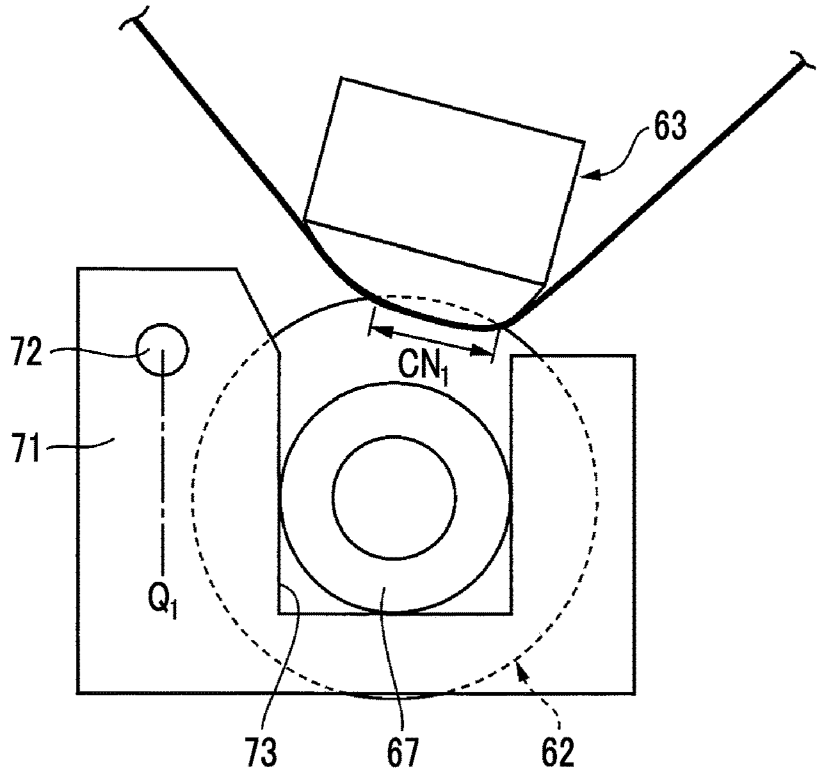
FIG. 16A is an explanatory diagram showing an operation state in a thick medium mode using the fifth configuration example shown in FIG. 15.
Figure 16B:
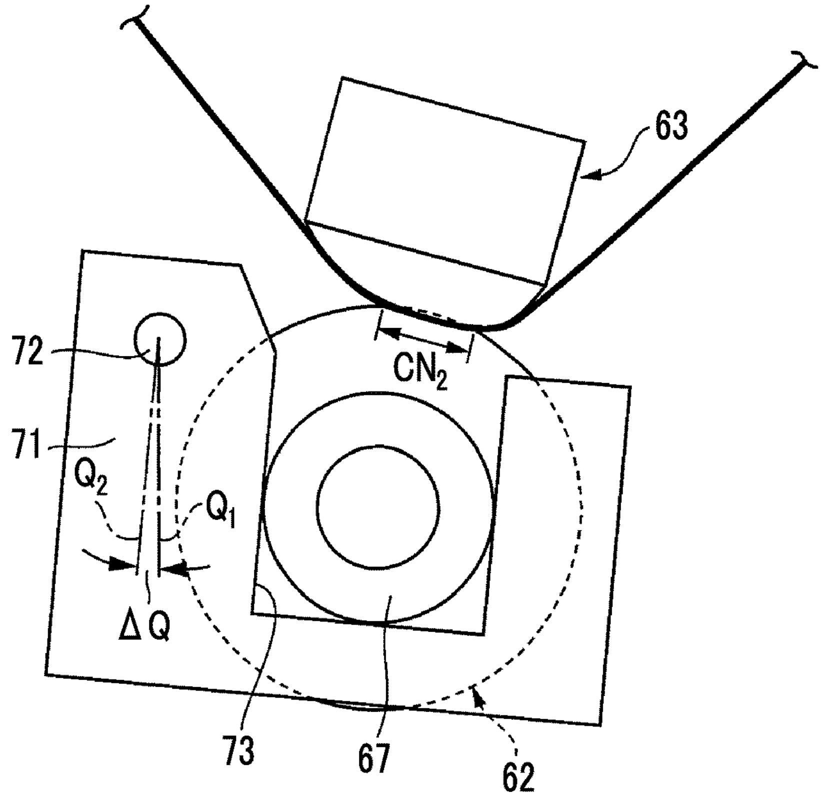
FIG. 16B is an explanatory diagram showing an operation state in a thin medium mode using the same fifth configuration example.

Fifth Configuration Example (Refer to FIGS. 15 to 16B)

FIG. 15 shows a fifth configuration example of the contact region variable mechanism 80 according to the first exemplary embodiment.

In FIG. 15, the contact region variable mechanism 80 is configured by using the retract mechanism 70 of the pressurization roll 62.

In this example, in the retract mechanism 70, the swing holding arm 71 is supported to be swingable around the swing support shaft 72, the bearing 67 of the pressurization roll 62 is held in the U-shaped groove 73, as a contact and separation mechanism 140 for the contact and separation of the swing holding arm 71, a projection piece 141 projects from the free end side of the swing holding arm 71, an eccentric cam 142 is arranged below the projection piece 141 to be in contact with the projection piece 141, a bias spring 143 that biases the projection piece 141 toward the eccentric cam 142 is arranged on the opposite side of the projection piece 141 from the eccentric cam 142, and a drive motor 144 rotates the eccentric cam 142 by switching between a long diameter position and a short diameter position.

In this example, as shown in FIG. 15, in the retract mechanism 70, in a case where a short diameter $R_S$ of the eccentric cam 142 abuts on the projection piece 141, the pressurization roll 62 is retracted to the retract position, and in a case where a long diameter $R_L$ of the eccentric cam 142 abuts on the projection piece 141, the pressurization roll 62 is arranged at the set position.

In this example, the contact region variable mechanism 80 uses a middle diameter position other than the long diameter and short diameter positions of the eccentric cam 142 in the contact and separation mechanism 140 of the retract mechanism 70, and rotates the pressurization roll 62 around the swing support shaft 72 of the swing holding arm 71 to vary the width dimension of the contact region CN.

In this example, in a case where a long diameter $R_L$ of the eccentric cam 142 abuts on the projection piece 141, the pressurization roll 62 is arranged at the set position. In this state, as shown in FIGS. 15 and 16A, it is assumed that the pressurization roll 62 is arranged so as to secure the contact region CN1 for a thick medium mode. The posture position of the swing holding arm 71 is indicated by Q1 in FIG. 16A.

On the other hand, as shown in FIGS. 15 and 16B, in a case where the drive motor 144 is stopped at a position where a middle diameter $R_M$ ($R_S<R_M<R_L$) of the eccentric cam 142 abuts on the projection piece 141, the posture position of the swing holding arm 71 becomes in a state of being inclined from Q1 to Q2 by ΔQ, and the pressurization roll 62 is arranged so as to secure the contact region CN2 for a thin medium mode.

In this case, although the width dimension of the contact region CN2 becomes narrower than the width dimension of the contact region CN1 by the amount by which the pressurization roll 62 is swung to a position slightly separated from the fixing belt 61 side, the intrusion amount of the outlet side end portion of the contact region CN2 is not changed much from the intrusion amount of the outlet side end portion of the contact region CN1 due to the relative positional relationship with the pressing pad 63, and therefore, the contact pressure of the outlet side end portion of the contact region CN2 is maintained without reduction.

Second Exemplary Embodiment

Figure 17:
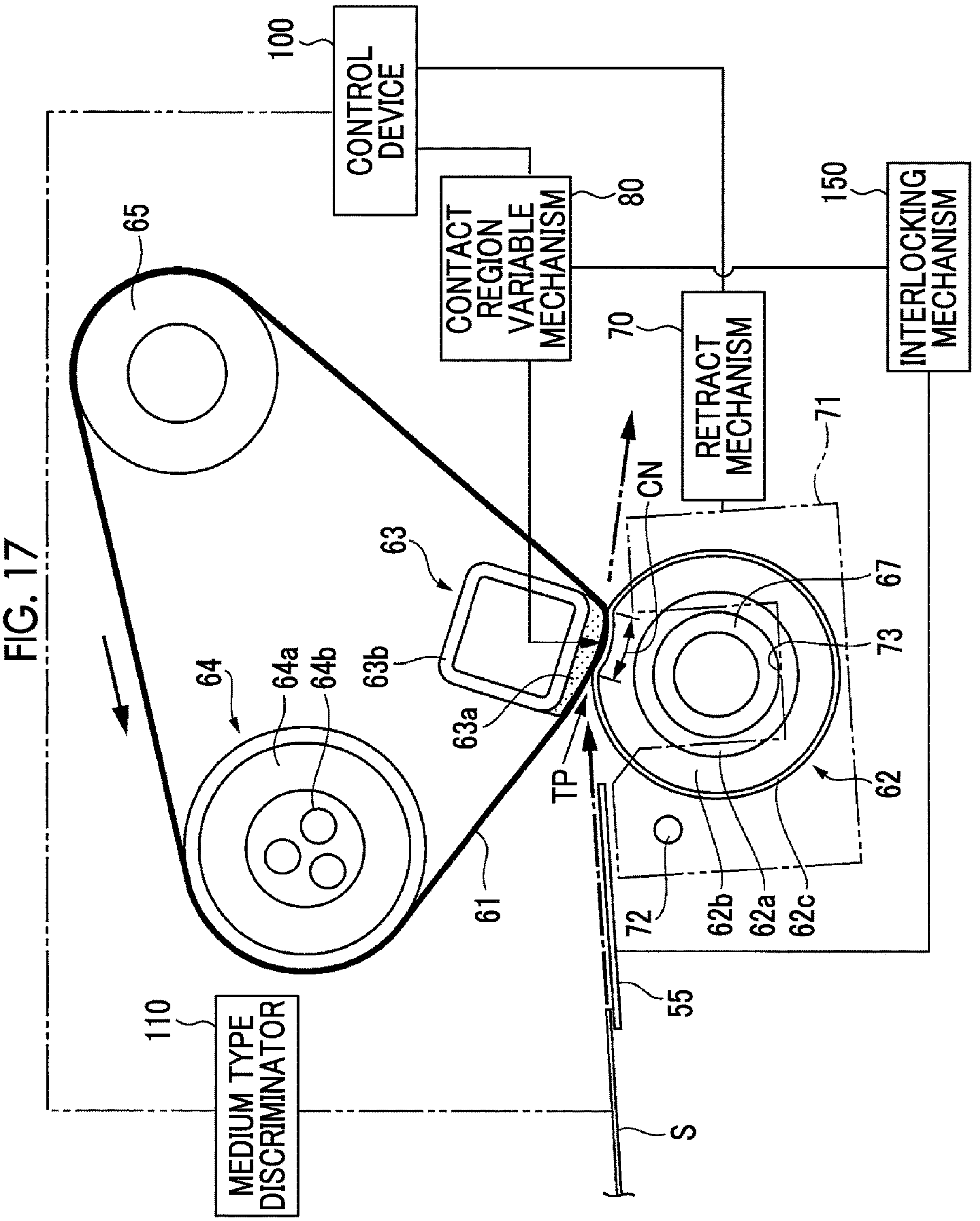
FIG. 17 is an explanatory diagram showing a fixing device as a heating device used in a second exemplary embodiment.

FIG. 17 is an explanatory diagram showing a main part of a fixing device according to a second exemplary embodiment.

In FIG. 17, the basic configuration of the fixing device 60 is substantially the same as the basic of the fixing device 60 of the first exemplary embodiment, but unlike the first exemplary embodiment, the position and posture of the guide chute 55 are changed in conjunction with the change of the contact region CN via an interlocking mechanism 150 that interlocks the guide chute 55, which guides the medium S to the contact region CN, with the contact region variable mechanism 80.

In this example, the width dimension of the contact region CN of the fixing device 60 is changed by the contact region variable mechanism 80, but in a case where the position of the guide chute 55 is fixedly provided, there is a concern that the leading edge of the medium S guided along the guide chute 55 may reach a position different from the target position TP.

Therefore, in this example, the medium guide unit changes the position and posture of the guide chute 55 via the interlocking mechanism 150 so that the position and posture of the guide chute 55 are adjusted appropriately in response to the change of the contact region CN.

In this example, as shown in FIGS. 18A to 18D, the contact region variable mechanism 80 appropriately classified into the following four types is provided, and correspondingly, the position or posture of the guide chute 55 is changed.

Figure 18A:
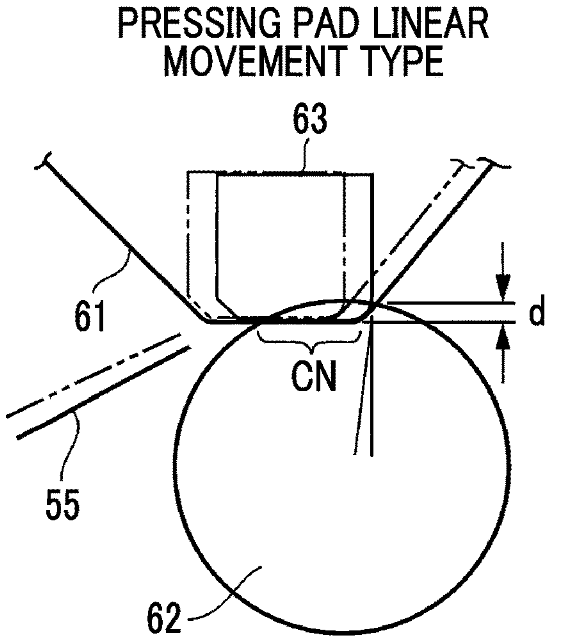
FIGS. 18A to 18D are explanatory diagrams showing various configuration principles of a contact region variable mechanism and a medium guide mechanism of the fixing device used in the second exemplary embodiment.

(1) Pressing Pad Linear Movement Type (Refer to FIG. 18A)

This is a method in which the pressing pad 63 is linearly moved along the width direction of the contact region CN, and the width dimension of the contact region CN is changed with the position of the outlet side end portion of the contact region CN as a reference. In this example, the guide chute 55 may be moved in parallel following the linear movement of the pressing pad 63 due to the change of the contact region CN.

Figure 18B:
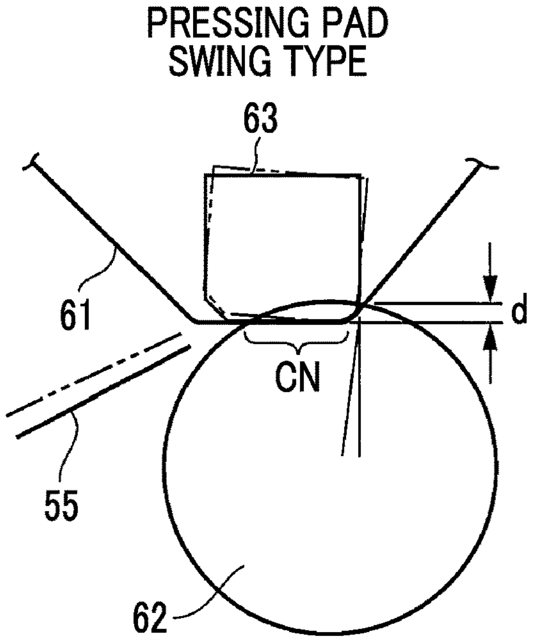

(2) Pressing Pad Swing Type (Refer to FIG. 18B)

In this method, the pressing pad 63 is swung around a swing fulcrum (not shown) so as to change the width dimension of the contact region CN.

In this example, the guide chute 55 may swing following the swing of the pressing pad 63 due to the change of the contact region CN.

Figure 18C:
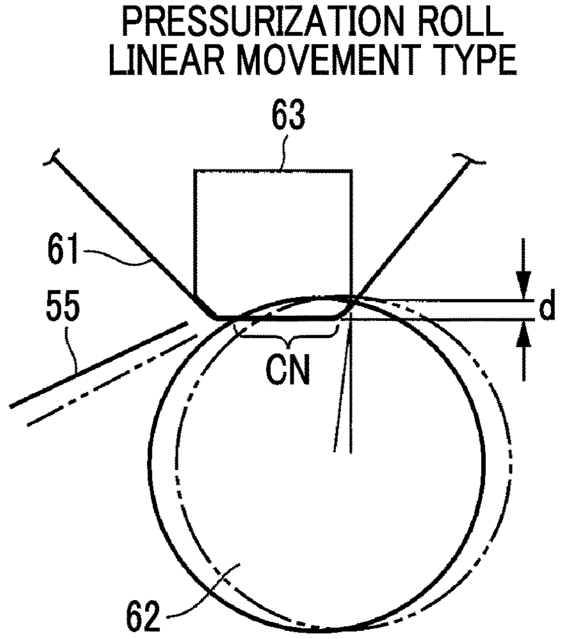

(3) Pressurization Roll Linear Movement Type (Refer to FIG. 18C)

This is a method in which the pressurization roll 62 is linearly moved along the width direction of the contact region CN, and the width dimension of the contact region CN is changed with the position of the outlet side end portion of the contact region CN as a reference. In this example, the guide chute 55 may be moved in parallel following the linear movement of the pressurization roll 62 due to the change of the contact region CN.

Figure 18D:
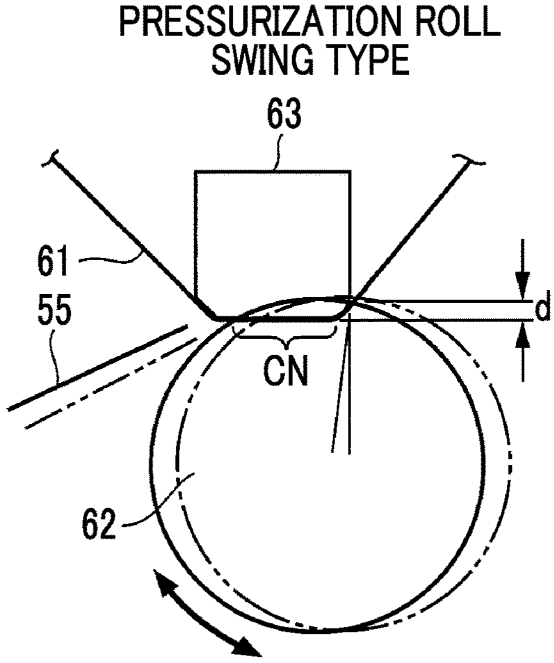

(4) Pressurization Roll Swing Type (Refer to FIG. 18D)

In this method, the pressurization roll 62 is swung around a swing support shaft (not shown) (which is different from the support shaft of the pressurization roll 62) so as to change the width dimension of the contact region CN. In this example, the guide chute 55 may swing following the swing of the pressurization roll 62 due to the change of the contact region CN.

Further, points to be noted in changing the position and posture of the guide chute 55 in conjunction with the contact region variable mechanism 80 are as follows.

Figure 19:
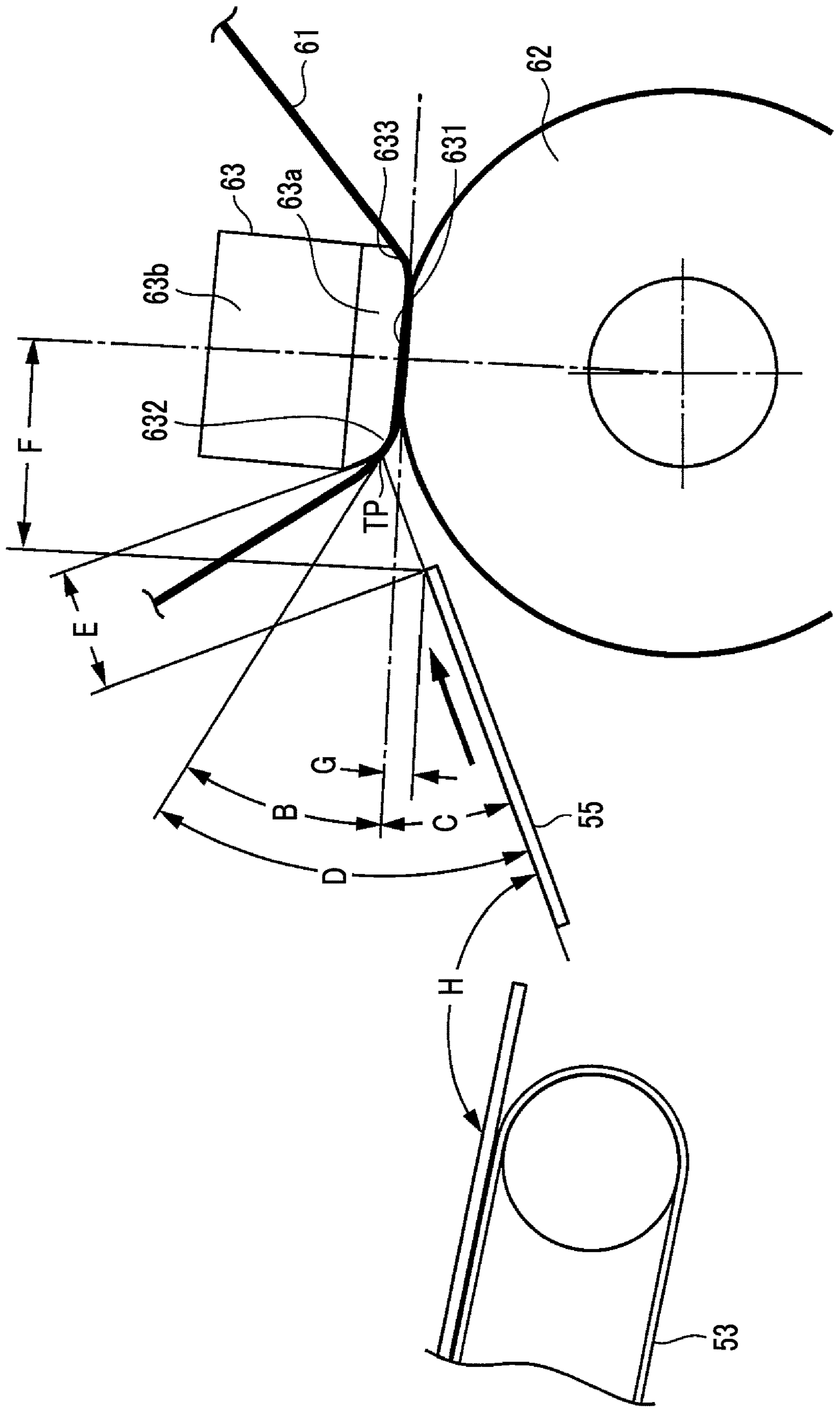
FIG. 19 is an explanatory diagram showing parameters to be considered in changing a guide chute of the medium guide mechanism according to the change of a contact region by the contact region variable mechanism in the second exemplary embodiment.

In FIG. 19, it is assumed that an intersection angle between the tangential direction of the inlet portion of the contact region CN and the extension direction of the flat portion 631 of the contact region CN is B, an intersection angle between the guidance direction of the guide chute 55 and the extension direction of the flat portion 631 of the contact region CN is C, an intersection angle between the tangential direction of the inlet portion of the contact region CN and the guidance direction of the guide chute 55 is D, a distance from an intersection between the guidance direction of the guide chute and the fixing belt 61 to the leading edge position of the guide chute 55 is E, a distance from a center line position of the pressing pad 63 in the width direction of the contact region CN to the leading edge position of the guide chute 55 is F, a distance between the leading edge position of the guide chute 55 and the extension direction line of the flat portion 631 of the contact region CN is G, and an intersection angle between a transport surface of the transport belt 53 for the medium S and the guide surface of the guide chute 55 is H.

(1) B, C, D, E, and G are not changed in principle.

(2) F is not particularly limited, but is preferably maintained in principle, for example.

(3) In a mode in which the guide chute 55 is moved in parallel, H is not changed, but in a mode in which the guide chute 55 is swung, H is changed.

(4) In a mode in which the guide chute 55 is swung, it is necessary to make the transport trajectory of the medium S transported from the transport belt 53 abut on the guide surface of the guide chute 55.

Configuration Example of Interlocking Mechanism

In the present exemplary embodiment, a specific configuration example of the interlocking mechanism 150 will be described.

Figure 20:
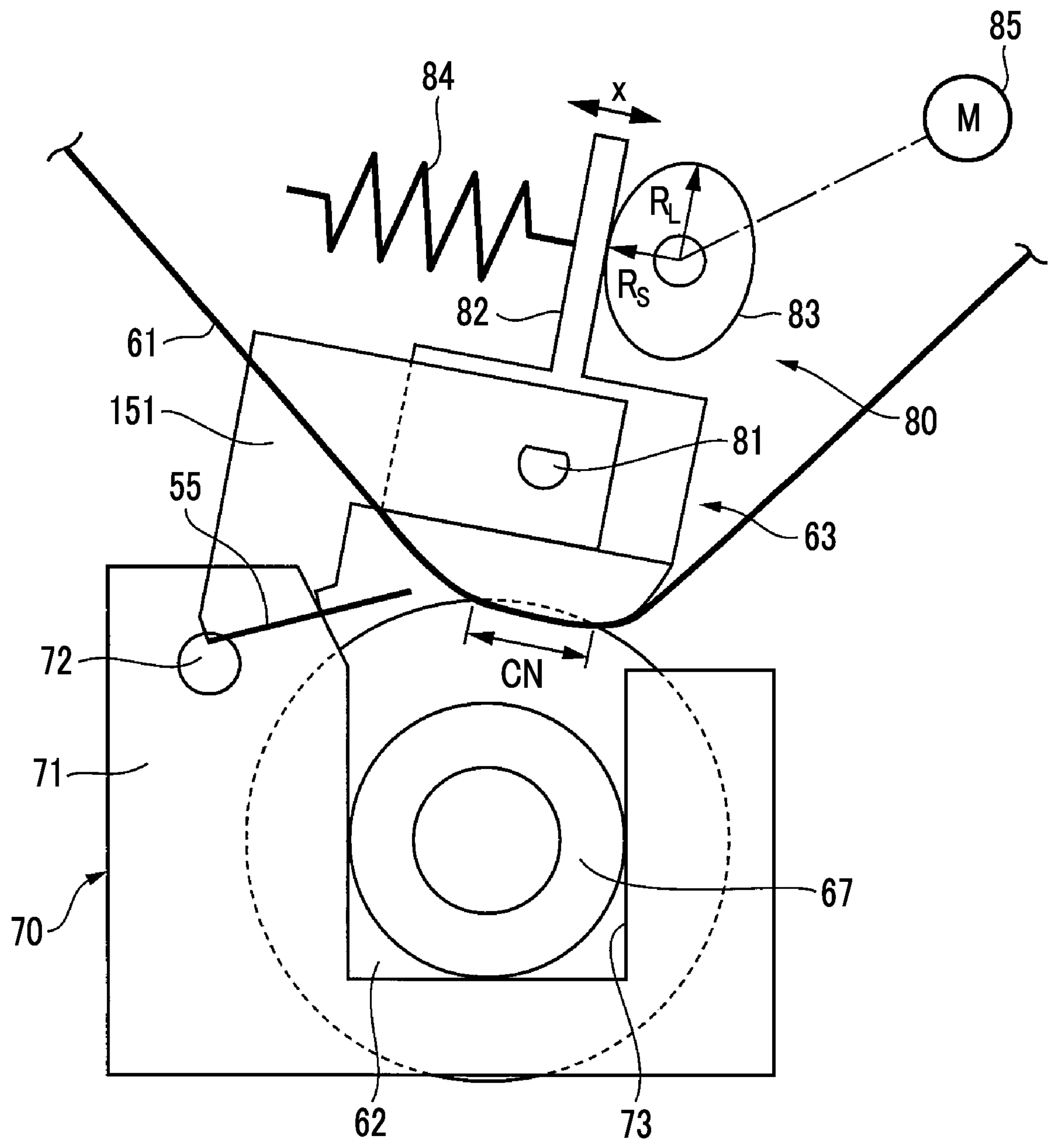
FIG. 20 is an explanatory diagram showing a first configuration example of the contact region variable mechanism and the medium guide mechanism used in the second exemplary embodiment.
Figure 21A:
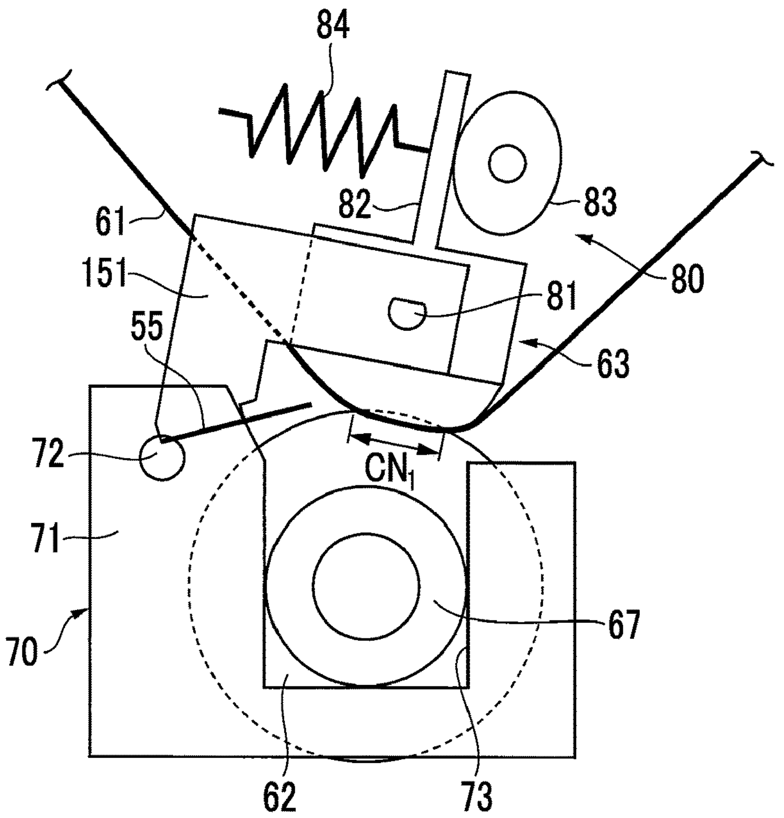
FIG. 21A is an explanatory diagram showing an operation state in a thick medium mode using the first configuration example shown in FIG. 20.
Figure 21B:
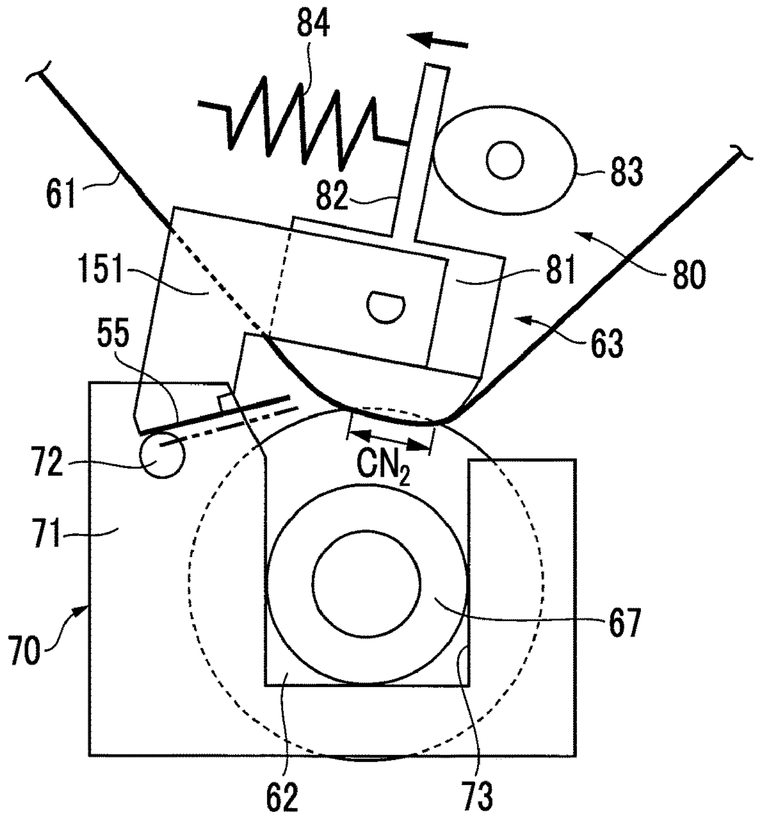
FIG. 21B is an explanatory diagram showing an operation state in a thin medium mode using the same first configuration example.

First Configuration Example (Refer to FIGS. 20 to 21B)

FIG. 20 shows a first configuration example of the interlocking mechanism 150 according to the second exemplary embodiment.

In FIG. 20, the contact region variable mechanism 80 is the same as the first configuration example of the first exemplary embodiment.

In this example, in the interlocking mechanism 150, for example, a support bracket 151 may be fastened to the guide projection 81, and the guide chute 55 may be fixed to the support bracket 151.

In this example, the guide chute 55 is moved in parallel in conjunction with the linear movement of the pressing pad 63, and properly maintains the positional relationship with the inlet portion of the contact region CN1 in a thick medium mode and the inlet portion of the contact region CN2 in a thin medium mode.

Figure 22:
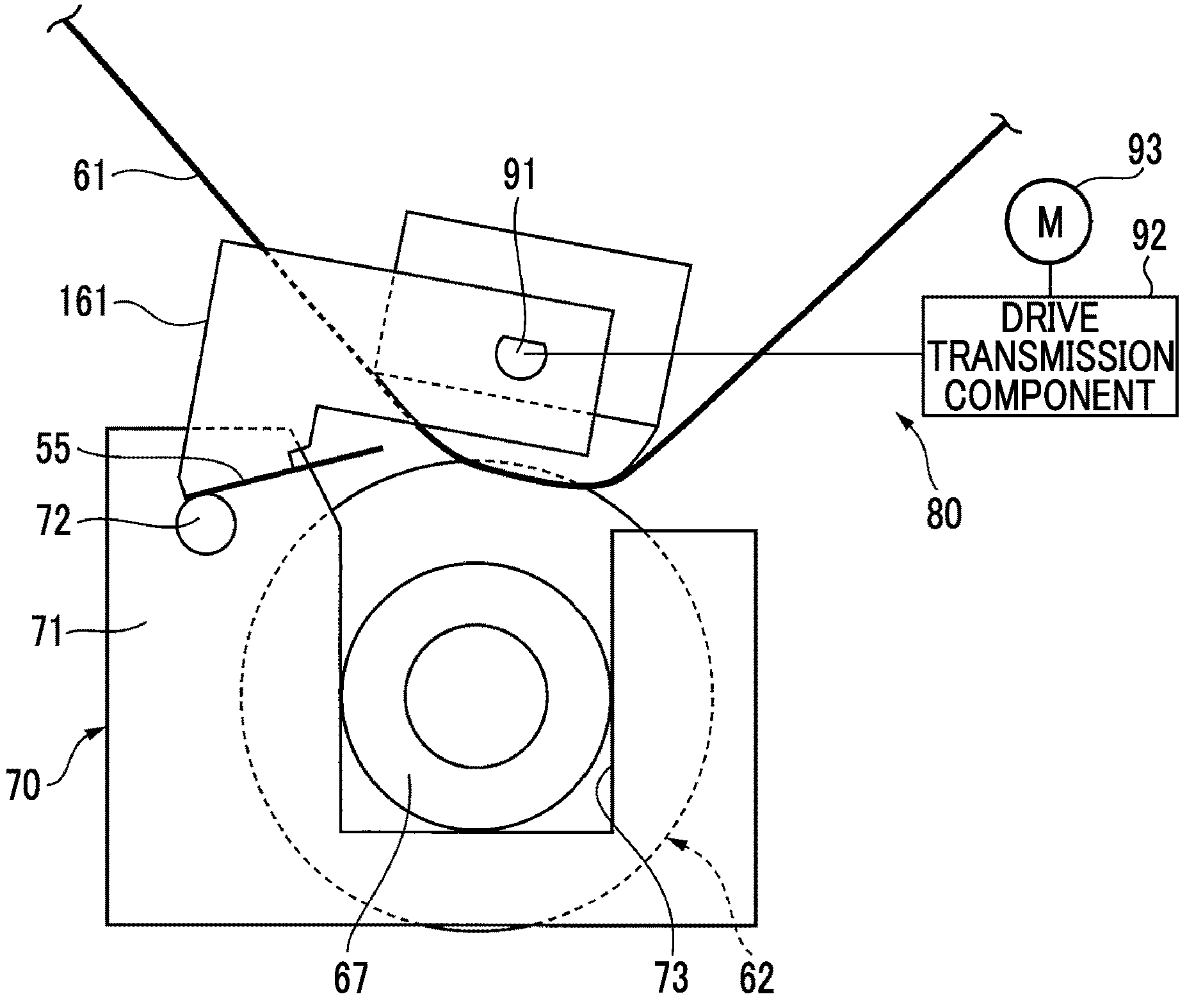
FIG. 22 is an explanatory diagram showing a second configuration example of the contact region variable mechanism and the medium guide mechanism used in the second exemplary embodiment.
Figure 23A:
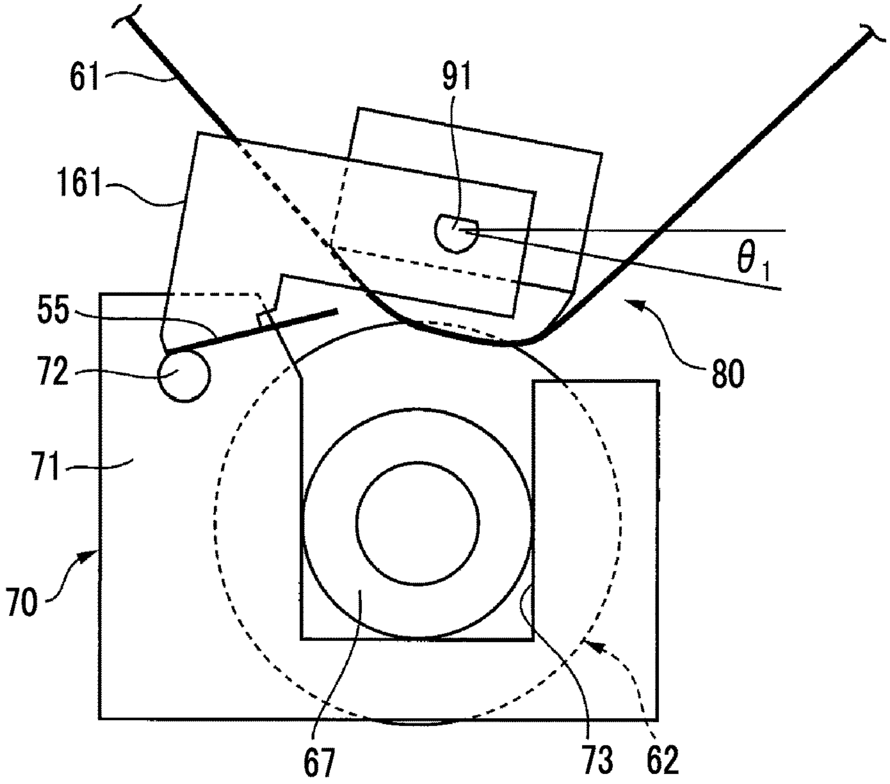
FIG. 23A is an explanatory diagram showing an operation state in a thick medium mode using the second configuration example shown in FIG. 22.
Figure 23B:
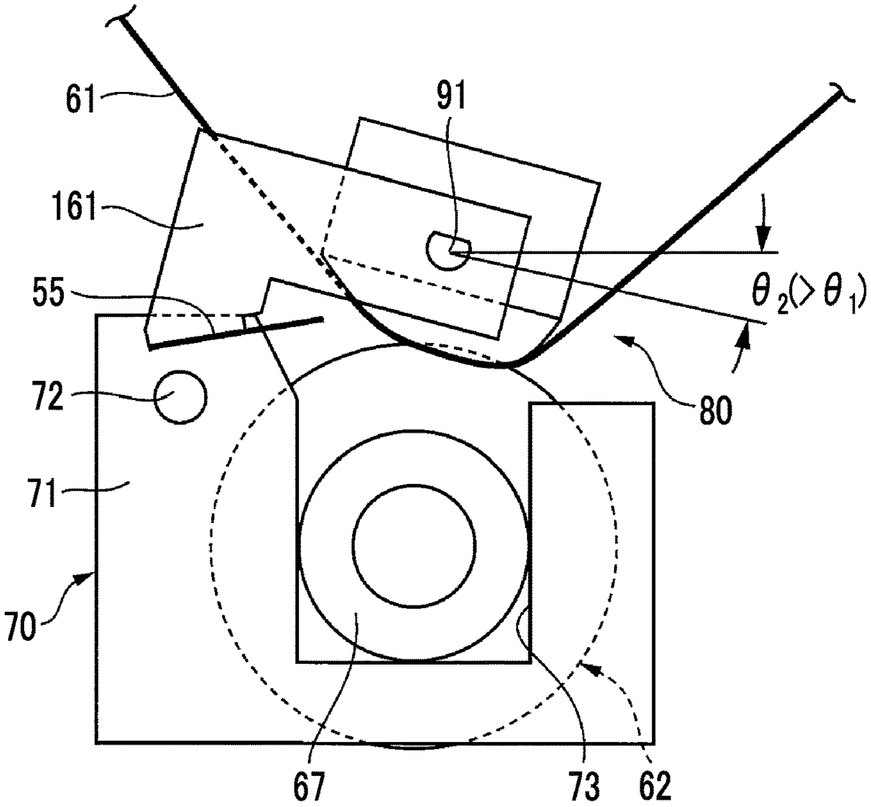
FIG. 23B is an explanatory diagram showing an operation state in a thin medium mode using the same second configuration example.

Second Configuration Example (Refer to FIGS. 22 to 23B)

FIG. 22 shows a second configuration example of the interlocking mechanism 150 according to the second exemplary embodiment.

In FIG. 22, the contact region variable mechanism 80 is the same as the second configuration example of the first exemplary embodiment.

In this example, in the interlocking mechanism 150, for example, a support bracket 161 may be fastened to the swing support shaft 91, and the guide chute 55 may be fixed to the support bracket 161.

In this example, the guide chute 55 is swung in conjunction with the swing of the pressing pad 63, and properly maintains the positional relationship with the inlet portion of the contact region CN1 in a thick medium mode and the inlet portion of the contact region CN2 in a thin medium mode.

Figure 24:
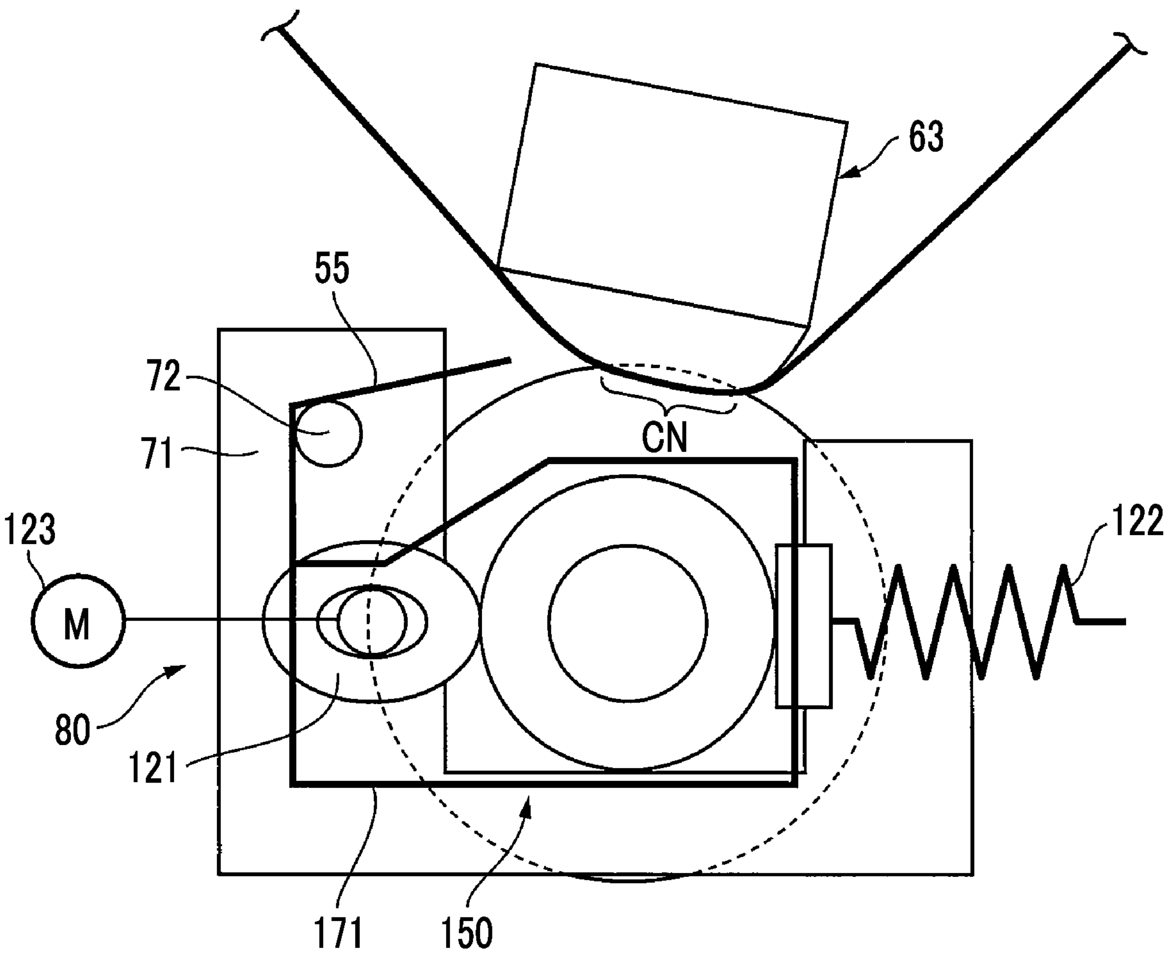
FIG. 24 is an explanatory diagram showing a third configuration example of the contact region variable mechanism and the medium guide mechanism used in the second exemplary embodiment.
Figure 25A:
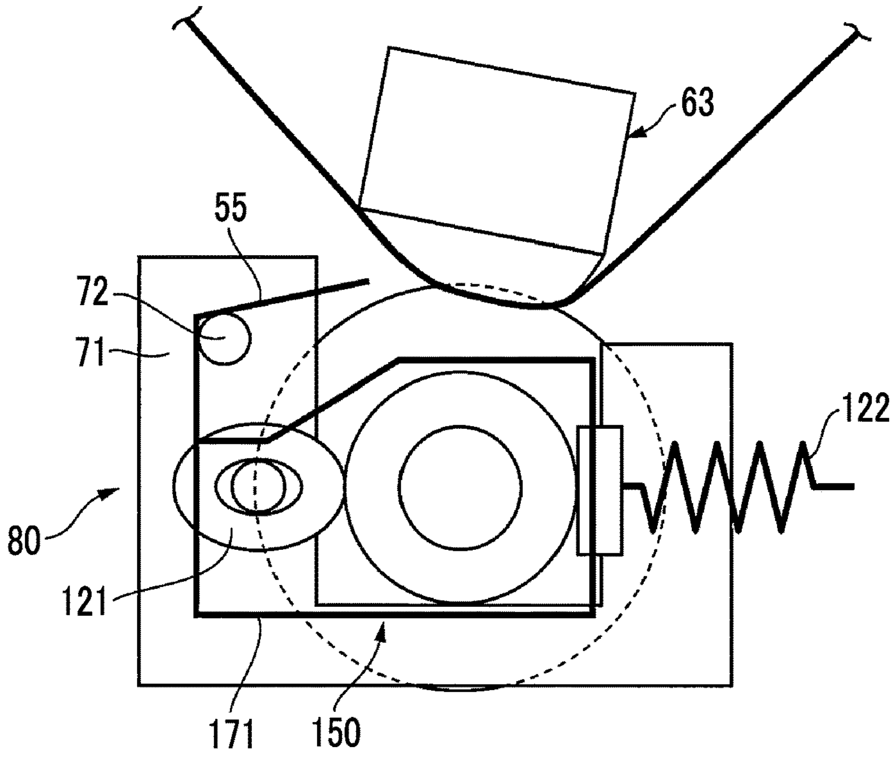
FIG. 25A is an explanatory diagram showing an operation state in a thick medium mode using the third configuration example shown in FIG. 24.
Figure 25B:
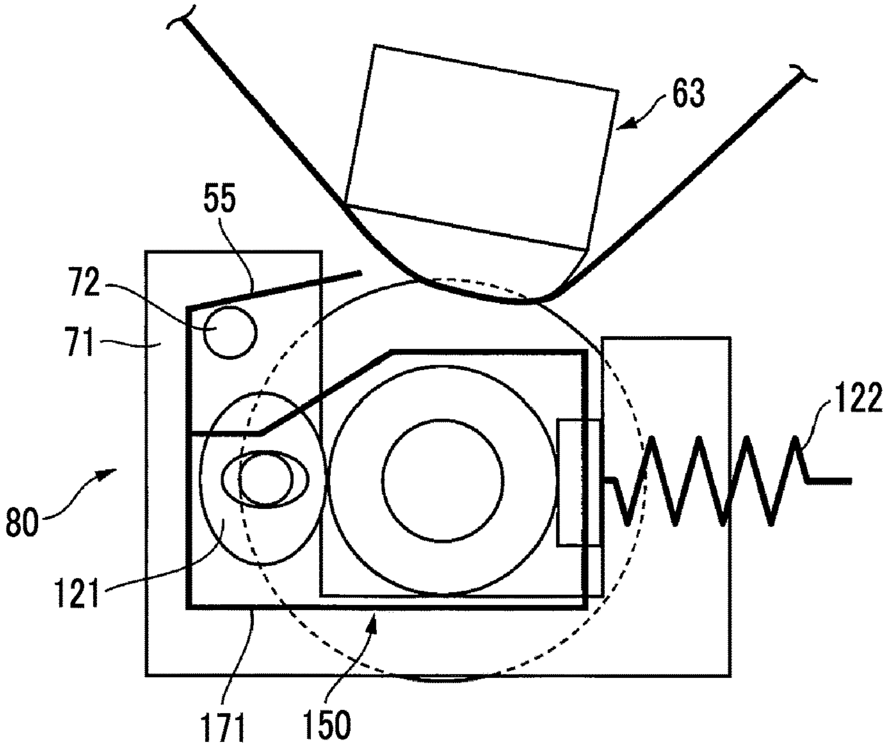
FIG. 25B is an explanatory diagram showing an operation state in a thin medium mode using the same third configuration example.

Third Configuration Example (Refer to FIGS. 24 to 25B)

FIG. 24 shows a third configuration example of the interlocking mechanism 150 according to the second exemplary embodiment.

In FIG. 24, the contact region variable mechanism 80 is the same as the third configuration example of the first exemplary embodiment.

In this example, in the interlocking mechanism 150, for example, a support bracket 171 may be attached to the bearing 67 of the pressurization roll 62, and the guide chute 55 may be fixed to the support bracket 171.

In this example, the guide chute 55 is moved in parallel in conjunction with the linear movement of the pressurization roll 62, and properly maintains the positional relationship with the inlet portion of the contact region CN1 in a thick medium mode and the inlet portion of the contact region CN2 in a thin medium mode.

Figure 26:
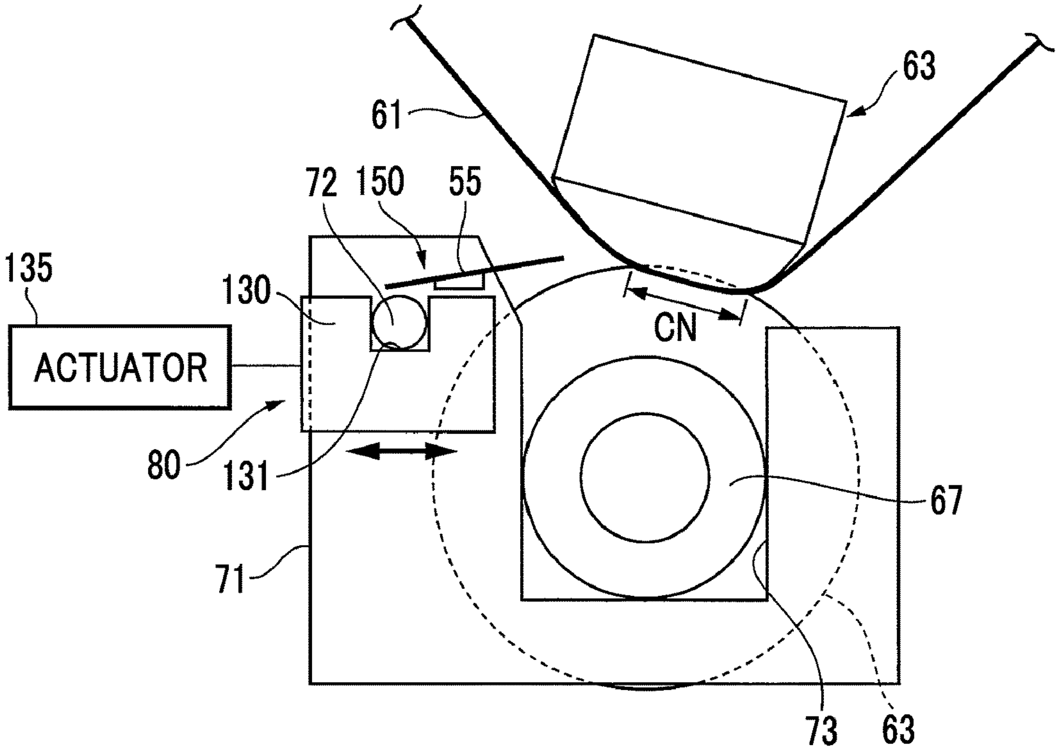
FIG. 26 is an explanatory diagram showing a fourth configuration example of the contact region variable mechanism and the medium guide mechanism used in the second exemplary embodiment.

Fourth Configuration Example (Refer to FIG. 26)

FIG. 26 shows a fourth configuration example of the interlocking mechanism 150 according to the second exemplary embodiment.

In FIG. 26, the contact region variable mechanism 80 is the same as the fourth configuration example of the first exemplary embodiment.

In this example, in the interlocking mechanism 150, the guide chute 55 is fastened to the swing holding arm 71.

In this example, the guide chute 55 is moved in parallel in conjunction with the linear movement of the pressurization roll 62, and properly maintains the positional relationship with the inlet portion of the contact region CN1 in a thick medium mode and the inlet portion of the contact region CN2 in a thin medium mode.

Figure 27:
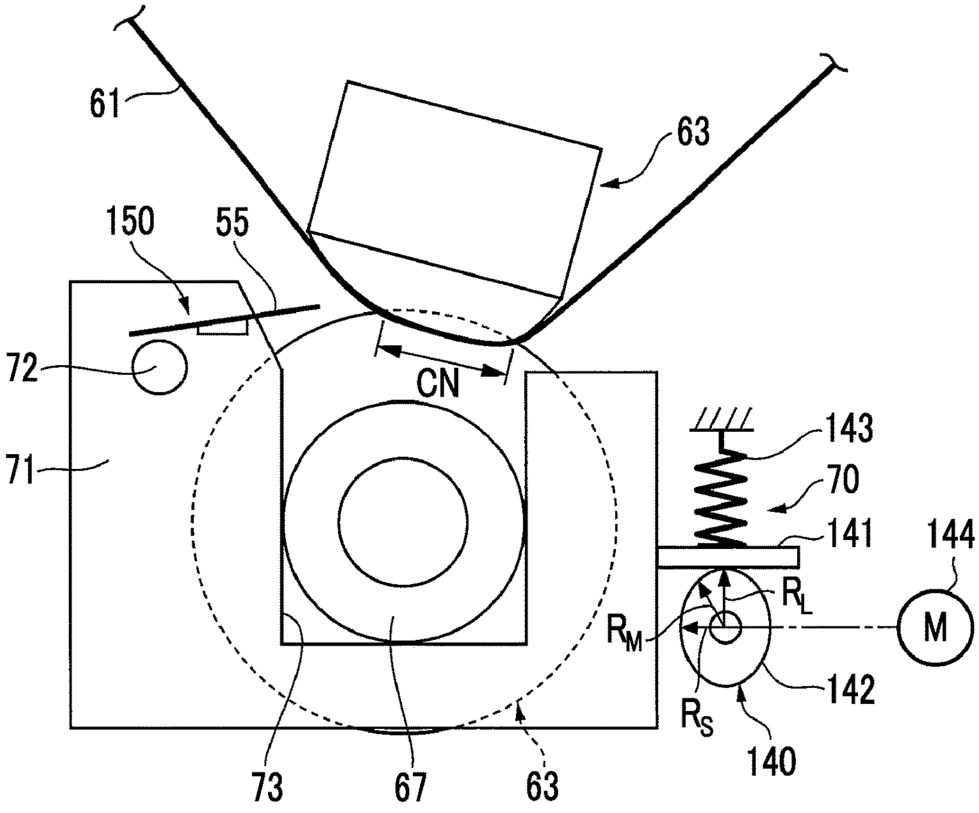
FIG. 27 is an explanatory diagram showing a fifth configuration example of the contact region variable mechanism and the medium guide mechanism used in the second exemplary embodiment.

Fifth Configuration Example (Refer to FIG. 27)

FIG. 27 shows a fifth configuration example of the interlocking mechanism 150 according to the second exemplary embodiment.

In FIG. 27, the contact region variable mechanism 80 is the same as the fifth configuration example of the first exemplary embodiment.

In this example, in the interlocking mechanism 150, the guide chute 55 is fastened to the swing holding arm 71.

In this example, the guide chute 55 is swung in conjunction with the swing of the pressurization roll 62, and properly maintains the positional relationship with the inlet portion of the contact region CN1 in a thick medium mode and the inlet portion of the contact region CN2 in a thin medium mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pressing device comprising:

a first pressurization unit, wherein the first pressurization unit is a pressurization roll;

a second pressurization unit that is provided to face the first pressurization unit, and sandwiches and pressurizes a medium moving in a contact region formed between the first pressurization unit and the second pressurization unit, wherein the second pressurization unit is a pressing member; and a contact region variable unit that changes a width dimension of the contact region along a moving direction of the medium in a state of maintaining a contact pressure on an outlet side of the contact region, in varying a contact state of the contact region, wherein the contact region variable unit comprises a motor, wherein the contact pressure on the outlet side of the contact region remains unchanged as the contact state of the contact region varies.

2. The pressing device according to claim 1, wherein the contact region variable unit moves the first pressurization unit or the second pressurization unit along a width direction of the contact region.

3. The pressing device according to claim 2, wherein the contact region variable unit changes the width dimension of the contact region with a position of an outlet side end portion of the contact region as a reference.

4. The pressing device according to claim 1, wherein the contact region variable unit swings the first pressurization unit or the second pressurization unit around a swing fulcrum such that the width dimension of the contact region is changed.

5. The pressing device according to claim 4, wherein the contact region variable unit maintains an intrusion amount of an outlet side end portion of the contact region at the same level in a swing range of the first pressurization unit or the second pressurization unit.

6. The pressing device according to claim 1, wherein in a case where the medium is a thin medium having a predetermined thickness or less, the contact region variable unit narrows the width dimension of the contact region as compared with other cases.

7. The pressing device according to claim 6, further comprising:

a discrimination unit that discriminates a type of a medium having a different thickness, wherein the discrimination unit comprises a thickness detector, wherein in a case where the discrimination unit discriminates that the medium is a thin medium having a predetermined thickness or less, the contact region variable unit narrows the width dimension of the contact region as compared with other cases.

8. The pressing device according to claim 1, wherein in a case where the medium is a thin medium having a predetermined thickness or less, the contact region variable unit causes a surface pressure of an outlet side end portion of the contact region to be larger than a surface pressure of other portions of the contact region.

9. The pressing device according to claim 1, wherein the second pressurization unit is fixedly installed on a back surface of an endless belt member that causes rotation of the first pressurization unit to be followed.

10. The pressing device according to claim 9, further comprising:

a heating unit that heats the endless belt member or the second pressurization unit.

11. A pressing process apparatus comprising:

a processing unit that applies an object to be pressurized on a medium, wherein the processing unit comprises a transfer roll; and the pressing device according to claim 1, which pressurizes the object to be pressurized on the medium.

12. A pressing device comprising:

a first pressurization unit, wherein the first pressurization unit is a pressurization roll;

a second pressurization unit that is provided to face the first pressurization unit, and sandwiches and pressurizes a medium moving in a contact region formed between the first pressurization unit and the second pressurization unit, wherein the second pressurization unit is a pressing member;

a contact region variable unit that changes a width dimension of the contact region along a moving direction of the medium in a state of maintaining a contact pressure on an outlet side of the contact region, in varying a contact state of the contact region, wherein the contact region variable unit comprises a motor; and a medium guide unit that is provided on an upstream side of the contact region in the moving direction of the medium, and guides the medium in accordance with an inlet portion of the contact region which is changed by the contact region variable unit, wherein the medium guide unit comprises a guide chute, wherein the contact pressure on the outlet side of the contact region remains unchanged as the contact state of the contact region varies.

13. The pressing device according to claim 12, wherein the contact region variable unit moves the first pressurization unit or the second pressurization unit along a width direction of the contact region.

14. The pressing device according to claim 13, wherein the contact region variable unit changes the width dimension of the contact region with a position of an outlet side end portion of the contact region as a reference.

15. The pressing device according to claim 12, wherein the contact region variable unit swings the first pressurization unit or the second pressurization unit around a swing fulcrum such that the width dimension of the contact region is changed.

16. The pressing device according to claim 15, wherein the contact region variable unit maintains an intrusion amount of an outlet side end portion of the contact region at the same level in a swing range of the first pressurization unit or the second pressurization unit.

17. The pressing device according to claim 12, wherein in a case where the medium is a thin medium having a predetermined thickness or less, the contact region variable unit narrows the width dimension of the contact region as compared with other cases.

18. The pressing device according to claim 12, wherein in a case where the first pressurization unit or the second pressurization unit is moved by the contact region variable unit, the medium guide unit is moved following the movement of the first pressurization unit or the second pressurization unit.

19. The pressing device according to claim 18, wherein in a case where the first pressurization unit or the second pressurization unit is moved along a width direction of the contact region by the contact region variable unit, the medium guide unit is moved along the contact region by a movement amount of the first pressurization unit or the second pressurization unit.

20. The pressing device according to claim 18, wherein in a case where the first pressurization unit or the second pressurization unit is swung by the contact region variable unit, the medium guide unit is swung around a swing fulcrum by a swing amount of the first pressurization unit or the second pressurization unit.

* * * * *